US012695682B2

(12) United States Patent
Malboubi et al.

(10) Patent No.: US 12,695,682 B2
(45) Date of Patent: ***Jul. 28, 2026

(54) DETERMINING SPATIAL-TEMPORAL INFORMATIVE PATTERNS FOR USERS AND DEVICES IN DATA NETWORKS

(71) Applicant: AT&T Intellectual Property I, L.P., Atlanta, GA (US)

(72) Inventors: Mehdi Malboubi, San Ramon, CA (US); Baofeng Jiang, Pleasanton, CA (US); Yuhong Zheng, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 162 days.

This patent is subject to a terminal disclaimer.

(21) Appl. No.: 18/819,364

(22) Filed: Aug. 29, 2024

(65) Prior Publication Data

US 2024/0422082 A1     Dec. 19, 2024

Related U.S. Application Data

(63) Continuation of application No. 17/453,404, filed on Nov. 3, 2021, now Pat. No. 12,107,741.

(51) Int. Cl.
*H04L 43/04* (2022.01)
*G06N 20/00* (2019.01)
(Continued)

(52) U.S. Cl.
CPC ............. *H04L 43/04* (2013.01); *G06N 20/00* (2019.01); *H04L 41/16* (2013.01); *H04L 43/045* (2013.01);
(Continued)

(58) Field of Classification Search
CPC ......... H04L 51/48; H04L 5/14; H04L 43/045; H04N 21/2381; G06B 19/418; G06B 19/0425
See application file for complete search history.

(56) References Cited

U.S. PATENT DOCUMENTS 5,966,701 A * 10/1999 Kohda ................. G06N 3/0499
706/26
8,045,582 B1 * 10/2011 Petrus ................ H04N 21/2381
370/468

(Continued)

*Primary Examiner* — Barbara B Anyan
(74) *Attorney, Agent, or Firm* — Guntin & Gust, PLC; John G. Rauch

(57) ABSTRACT

Spatial-temporal informative patterns for users and devices associated with data networks can be predicted or determined. An information management component (IMC) can analyze respective groups of items of data stored in respective formats in respective databases. Some items of data can comprise respective signal measurement data representative of respective signal measurements associated with respective devices associated with a communication network. Based on the analysis results, IMC can determine a spatial-temporal pattern(s) associated with the respective groups of items of data, wherein the spatial-temporal pattern(s) can relate to a subject of interest. The IMC can utilize artificial intelligence and/or machine learning algorithms and models to facilitate determining the spatial-temporal pattern(s). In response to a query relating to the subject of interest, the IMC can provide information relating to the subject of interest and responsive to the query based on the spatial-temporal pattern(s).

20 Claims, 13 Drawing Sheets

(51) Int. Cl.

| | |
|---|---|
| H04L 9/40 | (2022.01) |
| H04L 41/16 | (2022.01) |
| H04L 43/045 | (2022.01) |
| *G05B 19/042* | (2006.01) |
| *G05B 19/418* | (2006.01) |
| *G05B 23/02* | (2006.01) |

(52) U.S. Cl.
CPC ...... *H04L 63/1408* (2013.01); *G05B 19/0425* (2013.01); *G05B 19/418* (2013.01); *G05B 23/0289* (2013.01)

(56) References Cited

U.S. PATENT DOCUMENTS

| | | | | |
|---|---|---|---|---|
| 12,547,925 | B1 * | 2/2026 | Narayanaswamy | ......................... G06F 16/24542 |
| 2016/0098037 | A1 * | 4/2016 | Zornio | .................. H04L 43/045 700/20 |
| 2016/0165547 | A1 * | 6/2016 | Ouchi | ....................... H04L 5/14 455/522 |
| 2017/0245220 | A1 * | 8/2017 | Ouchi | .................. H04W 72/23 |
| 2019/0121350 | A1 * | 4/2019 | Cella | ................. G05B 19/4183 |
| 2019/0324441 | A1 * | 10/2019 | Cella | ................. G05B 19/0425 |
| 2020/0103894 | A1 * | 4/2020 | Cella | ................... G05B 19/418 |
| 2021/0342785 | A1 * | 11/2021 | Mann | ..................... G06F 40/18 |
| 2022/0180125 | A1 * | 6/2022 | Shen | .................... G06V 10/454 |
| 2022/0327101 | A1 * | 10/2022 | Pool | .................... G06N 3/0499 |
| 2023/0113092 | A1 * | 4/2023 | Abraham | .............. G06N 20/20 706/12 |

* cited by examiner

Figure 9:
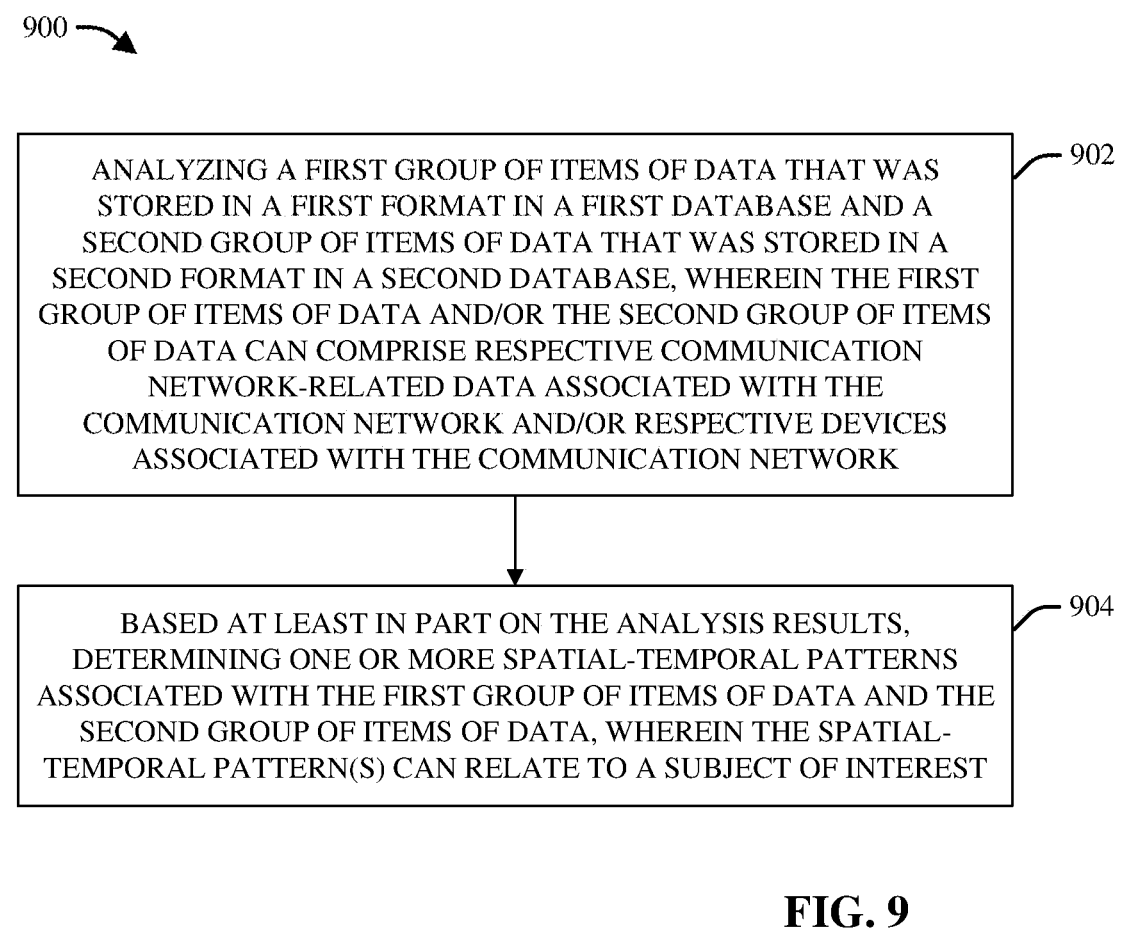

900 ⟍

ANALYZING A FIRST GROUP OF ITEMS OF DATA THAT WAS
STORED IN A FIRST FORMAT IN A FIRST DATABASE AND A
SECOND GROUP OF ITEMS OF DATA THAT WAS STORED IN A
SECOND FORMAT IN A SECOND DATABASE, WHEREIN THE FIRST
GROUP OF ITEMS OF DATA AND/OR THE SECOND GROUP OF ITEMS
OF DATA CAN COMPRISE RESPECTIVE COMMUNICATION
NETWORK-RELATED DATA ASSOCIATED WITH THE
COMMUNICATION NETWORK AND/OR RESPECTIVE DEVICES
ASSOCIATED WITH THE COMMUNICATION NETWORK

902

BASED AT LEAST IN PART ON THE ANALYSIS RESULTS,
DETERMINING ONE OR MORE SPATIAL-TEMPORAL PATTERNS
ASSOCIATED WITH THE FIRST GROUP OF ITEMS OF DATA AND THE
SECOND GROUP OF ITEMS OF DATA, WHEREIN THE SPATIAL-
TEMPORAL PATTERN(S) CAN RELATE TO A SUBJECT OF INTEREST

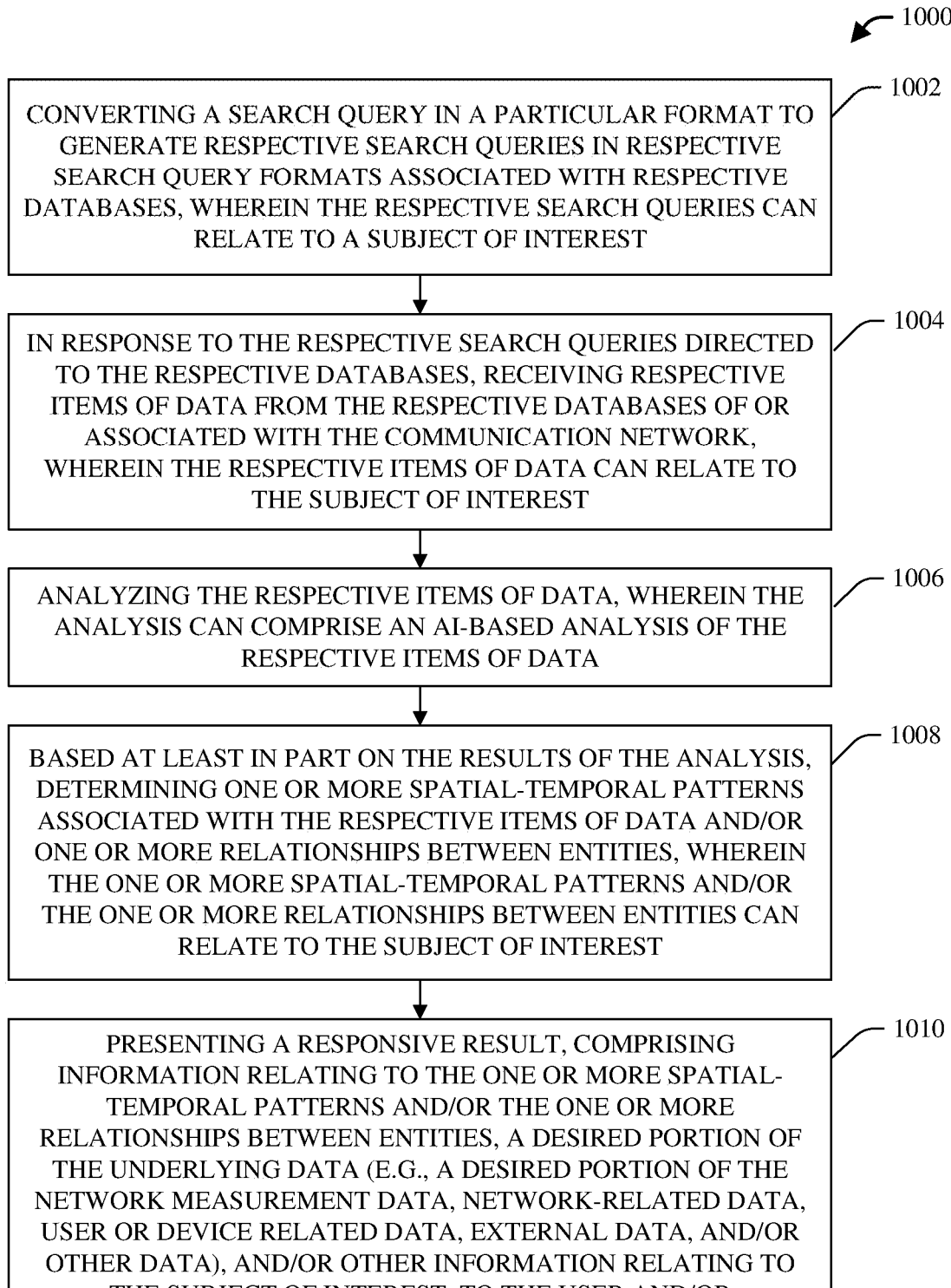

1000

CONVERTING A SEARCH QUERY IN A PARTICULAR FORMAT TO GENERATE RESPECTIVE SEARCH QUERIES IN RESPECTIVE SEARCH QUERY FORMATS ASSOCIATED WITH RESPECTIVE DATABASES, WHEREIN THE RESPECTIVE SEARCH QUERIES CAN RELATE TO A SUBJECT OF INTEREST

1002

IN RESPONSE TO THE RESPECTIVE SEARCH QUERIES DIRECTED TO THE RESPECTIVE DATABASES, RECEIVING RESPECTIVE ITEMS OF DATA FROM THE RESPECTIVE DATABASES OF OR ASSOCIATED WITH THE COMMUNICATION NETWORK, WHEREIN THE RESPECTIVE ITEMS OF DATA CAN RELATE TO THE SUBJECT OF INTEREST

1004

ANALYZING THE RESPECTIVE ITEMS OF DATA, WHEREIN THE ANALYSIS CAN COMPRISE AN AI-BASED ANALYSIS OF THE RESPECTIVE ITEMS OF DATA

1006

BASED AT LEAST IN PART ON THE RESULTS OF THE ANALYSIS, DETERMINING ONE OR MORE SPATIAL-TEMPORAL PATTERNS ASSOCIATED WITH THE RESPECTIVE ITEMS OF DATA AND/OR ONE OR MORE RELATIONSHIPS BETWEEN ENTITIES, WHEREIN THE ONE OR MORE SPATIAL-TEMPORAL PATTERNS AND/OR THE ONE OR MORE RELATIONSHIPS BETWEEN ENTITIES CAN RELATE TO THE SUBJECT OF INTEREST

1008

PRESENTING A RESPONSIVE RESULT, COMPRISING INFORMATION RELATING TO THE ONE OR MORE SPATIAL-TEMPORAL PATTERNS AND/OR THE ONE OR MORE RELATIONSHIPS BETWEEN ENTITIES, A DESIRED PORTION OF THE UNDERLYING DATA (E.G., A DESIRED PORTION OF THE NETWORK MEASUREMENT DATA, NETWORK-RELATED DATA, USER OR DEVICE RELATED DATA, EXTERNAL DATA, AND/OR OTHER DATA), AND/OR OTHER INFORMATION RELATING TO THE SUBJECT OF INTEREST, TO THE USER AND/OR COMMUNICATION DEVICE ASSOCIATED WITH THE USER

DETERMINING SPATIAL-TEMPORAL INFORMATIVE PATTERNS FOR USERS AND DEVICES IN DATA NETWORKS

CROSS REFERENCE TO RELATED APPLICATIONS

This application is a continuation of U.S. patent application Ser. No. 17/453,404 filed on Nov. 3, 2021. All sections of the aforementioned application are incorporated herein by reference in their entirety.

TECHNICAL FIELD

This disclosure relates generally to electronic communications, e.g., to determining spatial-temporal informative patterns for users and devices in data networks.

BACKGROUND

Communication devices and associated users can communicate and otherwise interact with each other for a variety of purposes and applications. For instance, users can utilize communication devices for recreational purposes, entertainment purposes, business purposes, education purposes, or other desired purposes.

The above-described description is merely intended to provide a contextual overview regarding electronic communications, and is not intended to be exhaustive.

BRIEF DESCRIPTION OF THE DRAWINGS

FIG. 9 illustrates a flow chart of an example method that can determine spatial-temporal informative patterns associated with users and associated devices associated with data networks, in accordance with various aspects and embodiments of the disclosed subject matter.

FIG. 10 depicts a flow chart of an example method that can determine spatial-temporal informative patterns relating to users and associated devices associated with data networks and/or determine relationships between entities, in accordance with various aspects and embodiments of the disclosed subject matter.

DETAILED DESCRIPTION

Figure 1:
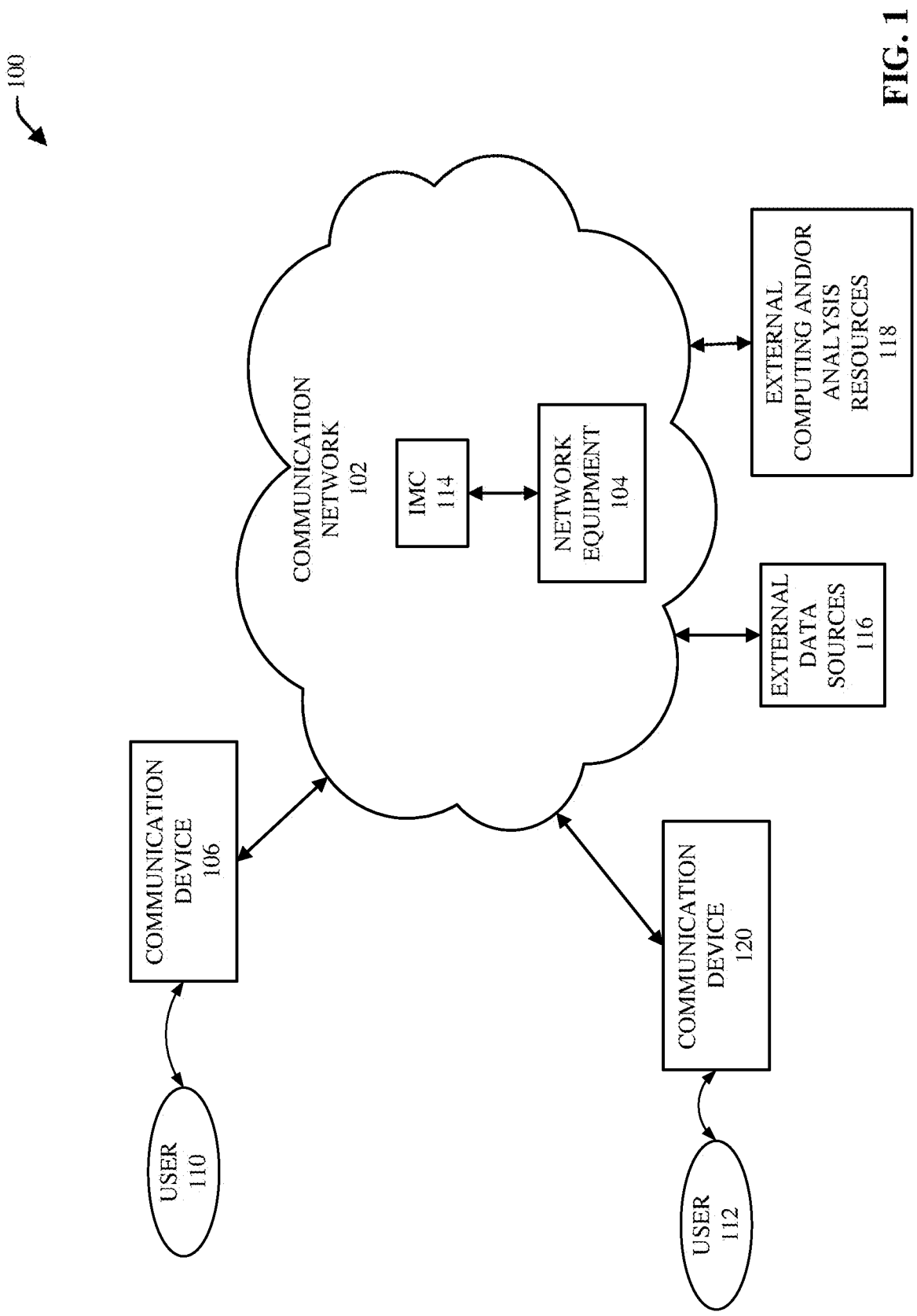
FIG. 1 illustrates a block diagram of an example system that can desirably predict, determine, and/or generate spatial-temporal informative patterns for users and devices in data networks, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Communication devices and associated users can communicate and otherwise interact with each other for a variety of purposes and applications. For instance, users can utilize communication devices for recreational purposes, entertainment purposes, business purposes, education purposes, or other desired purposes. Having a wide and diverse insight about how users behave and interact with each other and the communication infrastructure and how communication and network devices perform/interact to handle the traffic can be desirable for adding business value, saving costs, and desirable (e.g., suitable, enhanced, or optimal) network operation.

Growth in different aspects of some businesses can depend in part on the careful modeling, analyzing, and predicting of users and devices patterns in data networks. There can be a large volume of data (e.g., network measurements, call records, and/or other data) that can be generated on a daily basis. Such data can contain a variety of information that can be analyzed to provide a vast and diverse insight on the behavior of users and devices.

To that end, techniques for desirably predicting, determining, and/or generating spatial-temporal informative patterns for users and devices in data networks are presented. The disclosed subject matter can automatically and intelligently provide spatial-temporal informative patterns and insights of how users and devices behave and interact in various applications. The disclosed subject matter can comprise a framework that can accept a user request for analysis, intelligently process the request, and automatically provide spatial-temporal patterns and insights for various applications. The informative patterns (e.g., spatial-temporal informative patterns) provided by the disclosed subject matter can be used to add business value and generate more revenue for an entity (e.g., user, business, company, corporation, enterprise, or other entity) from different perspectives. For instance, such patterns and analysis provided by the disclosed subject matter can be used for desirable (e.g., suitable, customized, enhanced, and/or optimal) resource allocation, network planning, advertising, collaboration with vendors and device manufacturers, service offers, and/or competitive service bonuses or incentives.

The disclosed subject matter can comprise an information management component (IMC) that can analyze respective groups of items of data stored in respective formats in respective databases (e.g., relational database(s) and/or non-relational database(s). Some of the items of data can be obtained from internal data sources or external data sources. Some items of data can comprise respective signal measurement data representative of respective signal measurements associated with respective communication devices associated with a communication network. In some embodiments, the IMC can utilize artificial intelligence (AI)-based techniques, algorithms, and/or models (e.g., AI and/or machine learning (ML) techniques, algorithms, and/or models). Based at least in part on the analysis results, the IMC can determine a spatial-temporal pattern(s) associated with the respective groups of items of data, wherein the spatial-temporal pattern(s) can relate to a subject of interest (e.g., a subject of interest to a user or other entity). The subject of interest can be or relate to, for example, users, communication devices, network equipment of communication networks, performance indicators (e.g., key performance indicators (KPIs)) associated with communication devices and communication networks, aggressive or malicious behavior by communication devices, and/or other desired subjects of interest, such as more fully described herein. In response to a query relating to the subject of interest (e.g., a query received from a user), the IMC can provide information relating to the subject of interest and responsive to the query based at least in part on the spatial-temporal pattern(s) and/or data relating to the spatial-temporal pattern(s). In some embodiments, an IMC can be virtualized and instantiated at edges of the communication network to provide services with enhanced performance and lower latencies.

The disclosed subject matter, by employing the IMC and the techniques described herein, can enhance (e.g., improve or optimize) allocation of resources associated with a communication network, planning of the communication network, advertising of products and services, collaboration with vendors and device manufacturers, service offers that can be presented to customers and potential customers, and/or competitive service bonuses or incentives.

These and other aspects and embodiments of the disclosed subject matter will now be described with respect to the drawings.

Referring now to the drawings, FIG. 1 illustrates a block diagram of an example system 100 that can desirably predict, determine, and/or generate spatial-temporal informative patterns for users and devices in data networks, in accordance with various aspects and embodiments of the disclosed subject matter. The system 100 can comprise a communication network 102 can comprise a packet data network (e.g., an Internet Protocol (IP)-based network, such as the Internet and/or intranet) and/or a mobility core network (e.g., a wireless communication network), wherein the packet data network can be associated with (e.g., communicatively connected to) the mobility core network. The packet data network can be or can comprise the Internet or an intranet. The communication network 102 can comprise various network equipment 104 that can facilitate communication of data traffic in or associated with the communication network 102. The network equipment 104 can comprise servers, routers, access points (e.g., base stations or cells, or other type of access point), gateways, modems, network nodes, hubs, bridges, switches, processors, data stores, or other type of network equipment that can facilitate wireline or wireless communication of data traffic in or associated with the communication network 102. The network equipment 104 also can comprise or facilitate the generation (e.g., creation) or instantiation of virtualized network equipment, components, and/or functions (e.g., virtualized processors, servers, controllers, applications, and/or other desired components or functions), which can be employed, for example, to facilitate edge computing and services (e.g., mobile edge computing and other edge services), network slicing (e.g., generation or instantiation of network slices), network security, and/or other desired network uses or services.

At various times, communication devices, such as, for example, communication device 106 and/or communication device 108, associated with users, such as user 110 and user 112, can be associated with (e.g., communicatively connected to) the communication network 102 to communicate with other communication devices that are associated with the communication network 102. For instance, a communication device (e.g., 106) can communicate a message, request, or query, via the communication network 102, to another communication device to communicate information to the other communication device or request information from the other communication device. A communication device (e.g., 106) can communicate with the communication network 102 using a wireless communication connection or a wireline communication connection.

A communication device (e.g., 106 or 108) also can be referred to as, for example, a device, a mobile device, a mobile communication device, user equipment (UE), a terminal, or a mobile terminal, or by other similar terminology. A communication device can refer to any type of wireline device or wireless device that can communicate with the communication network 102, wherein a wireless device can communicate with a radio network node in a core network (e.g., a cellular or mobile communication system) of the communication network 102. Examples of communication devices can include, but are not limited to, a computer (e.g., a desktop computer, a server, a laptop embedded equipment (LEE), a laptop mounted equipment (LME), or other type of computer), a phone (e.g., a smart phone, cellular phone, or other type of phone that can utilize applications), a tablet or pad (e.g., an electronic tablet or pad), an electronic notebook, a Personal Digital Assistant (PDA), a device to device (D2D) UE, a machine type UE or a UE capable of machine to machine (M2M) communication, a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of device or sensor), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, or an oven, or other type of appliance having wireless communication functionality), a set-top box, an IP television (IPTV), a device associated or integrated with a vehicle (e.g., automobile, airplane, bus, train, or ship, or other type of vehicle), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of IoTs).

At desired times, a user (e.g., a network operator, engineer, technician, or representative, a business entity, a vendor, a device manufacturer, a device vendor, a first responder, or other type of user) can desire to obtain information relating to various subjects, topics, attributes, events, people, customers, issues, products, devices, communication networks, applications, or other matters. Sometimes the information desired by (e.g., requested or queried by) the user (e.g., user 110 or user 112) can be very detailed, intricate, convoluted, or not readily ascertainable, and/or can involve various items of data that can be distributed across various different data sources and/or can seemingly be unrelated to each other (e.g., there may be no relationship known or established between various items of data such that the items of data do not appear to be related to each other).

In accordance with various embodiments, the system 100 can comprise an information management component (IMC) 114 that can desirably (e.g., suitably, acceptably, and/or optimally) infer, predict, determine, or identify patterns in items of data, including items of data that can be distributed across various different data sources, can be in various different formats, and/or can seemingly be unrelated to each other, in accordance with defined information management criteria. The disclosed subject matter, employing the IMC 114, can automatically and intelligently determine, infer, and/or provide spatial-temporal informative patterns (also referred to herein as patterns or spatial-temporal patterns) and insights of how users and devices (e.g., communication devices) behave and interact in various applications. The IMC 114 can comprise a framework that can accept a request (e.g., from a communication device, such as device 106 or 108) from a user (e.g., user 110 or 112) for analysis, intelligently process the request, and determine, infer, and/or provide (e.g., automatically or dynamically determine, infer, and/or provide) spatial-temporal patterns and insights for various applications. The spatial-temporal informative patterns provided by the IMC 114 can be used, for example, to add business value and generate more revenue for an entity (e.g., user, business, company, corporation, enterprise, or other entity) from different perspectives. For instance, such patterns and analysis provided by the IMC 114 can be used for desirable (e.g., suitable, customized, enhanced, and/or optimal) allocation of resources in or associated with the communication network 102, planning of the communication network 102, advertising of products and services, collaboration with vendors and device manufacturers, service offers that can be presented to customers and potential customers, and/or competitive service bonuses or incentives.

Figure 2:
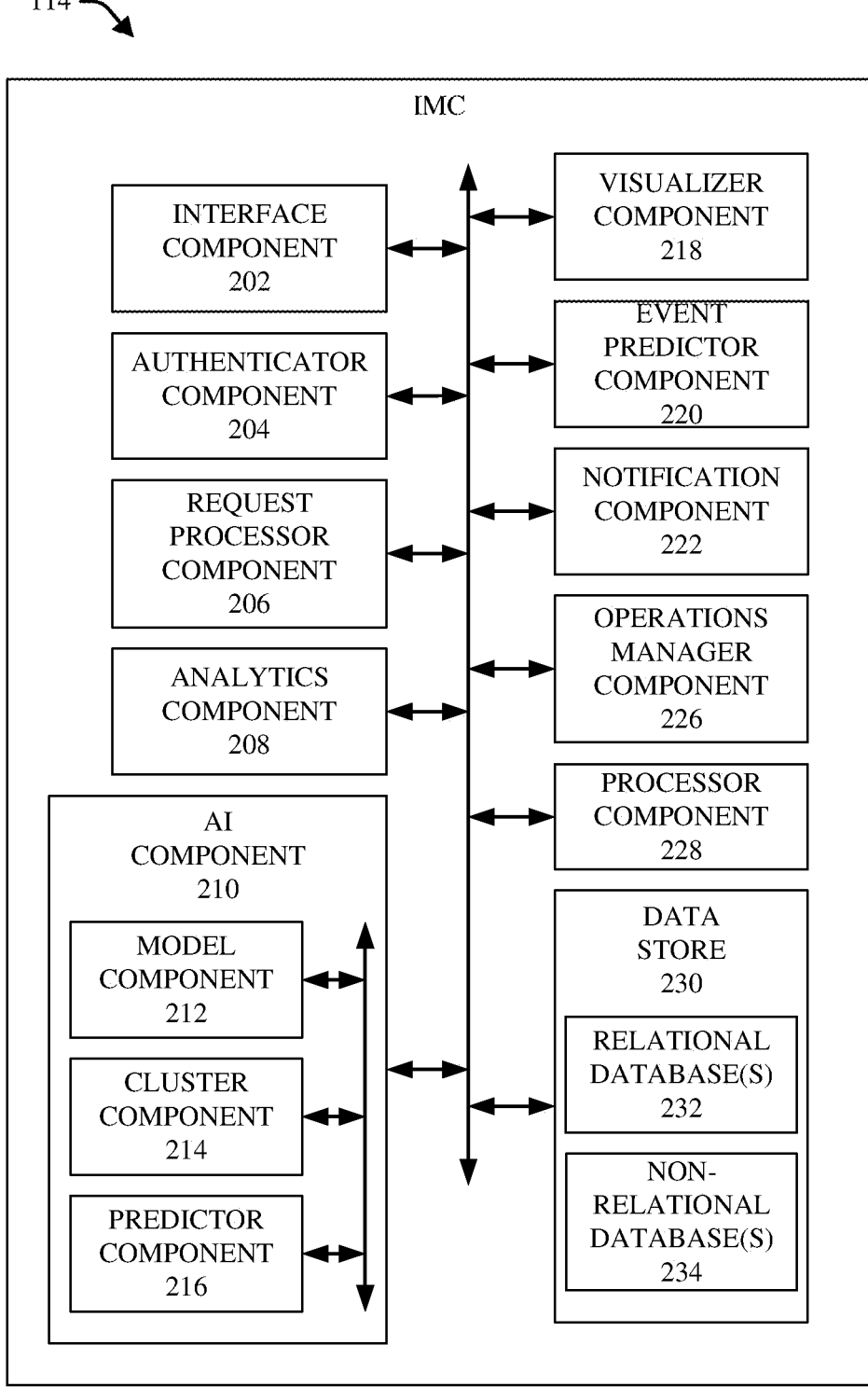
FIG. 2 depicts a block diagram of an example information management component (IMC), in accordance with various aspects and embodiments of the disclosed subject matter.

Referring to FIG. 2 (along with FIG. 1), FIG. 2 depicts a block diagram of an example IMC 114, in accordance with various aspects and embodiments of the disclosed subject matter. As shown in FIG. 2, the IMC 114 can comprise an interface component 202, an authenticator component 204, a request processor component 206, an analytics component 208, and an AI component 210, which can include a model component 212, a cluster component 214, and a predictor component 216. The IMC 114 also can comprise a visualizer component 218, an event predictor component 220, a notification component 222, a data source component 224 (e.g., an internal data source component comprising one or more internal data sources of data of or associated with the communication network 102), an operations manager component 226, a processor component 228, and a data store 230, wherein the data store can comprise one or more relational databases 232 and one or more non-relational databases 234.

The IMC 114 can obtain (e.g., receive, collect, and/or aggregate) a large amount (e.g., volume) of data relating to the communication network 102, communication devices (e.g., 106 and/or 108), operation of communication devices and the communication network 102 (e.g., operation of the network equipment 104 of the communication network 102), entities (e.g., people, subscribers, enterprises, businesses, organizations, or other users or entities of or associated with communication devices or the communication network 102), services (e.g., services of or associated with the communication network 102), applications (e.g., applications of or associated with the communication network 102), products, events, and/or other subjects, topics, issues, or attributes. Some of the data can be obtained, collected, and/or stored by the data source component 224 (e.g., one or more internal data sources of the internal data source component). For instance, the data source component 224 can comprise or be a source for data relating to performance indicators (e.g., KPIs, STEM), other network measurements, and/or network data of or associated with the communication network 102 and/or communication devices (e.g., 106 and/or 108). Such data can include, for example, reference signal received power (RSRP), reference signal received quality (RSRQ), radio resource control (RRC) measurements, signal to interference plus noise ratio (SINR), received signal strength indicator (RSSI), channel quality indicator (CQI), throughput, throughput rate, bandwidth, quality of service (QOS), quality of experience (QoE), call data records (CDRs), FlowLogic data, and/or other network measurements or data.

In certain embodiments, based at least in part on the nature or type of data, the IMC 114 can store some data (e.g., network measurements, other network-related, device-related data, and/or other desired data received from internal data sources or external data sources) in the one or more relational databases 232 and/or the one or more non-relational databases 234. A significant portion of the data can be stored in relational databases 232, although a desired portion of the data can be stored in the non-relational databases 234 and/or can be stored in both relational database(s) 232 and a non-relational database(s) 234.

A relational database (e.g., 232) typically can store data in a relational form, such as in a data table comprising respective columns having respective column attributes and respective rows having respective row attributes, wherein respective items of data can be stored in respective locations (e.g., cells) of the data table associated with the respective column attributes and the respective row attributes. The items of data in a data table typically can have some kind of relationship with some or all of the other items of data of the data table. While a relational database comprising a data table is one common type of relational database, a relational database can be structured in a way that can be different than a data table structure. A non-relational database can comprise a database that typically does not utilize a data table structure or other type of relational structure (e.g., does not use a tabular schema of rows and columns). Some example relational databases that can be utilized by the IMC 114 can include Structured Query Language (SQL) databases, or other desired type of relational database.

A non-relational database (e.g., 234) can be more flexible with regard to how data is stored and represented in the non-relational database, as compared to a relational database, and typically can be structured to desirably represent the items of data being stored in the non-relational database and/or to satisfy (e.g., meet or exceed) any applicable specifications (e.g., guidelines, standards, criteria, or requirements) relating to the type(s) of data items and/or the application for which the non-relational database or associated items of data are to be used. Some example non-relational databases that can be utilized by the IMC 114 can include graph databases (e.g., Neo4j databases), time-series databases (e.g., Druid databases), NoSQL databases, JavaScript Object Notation (JSON) databases, or other desired type of non-relational database. Some graph databases can comprise, for example, data in the form of entities, edges, and/or vertices, wherein an edge between two entities (e.g., nodes) can or may represent a relationship between the two entities.

Graph databases typically can be structured and/or optimized for representing or exploring relationships (e.g., weighted relationships) between entities. Time-series databases typically can store and/or represent items of data as time-based sequences of data, and time-series databases can be structured and/or optimized for queries for information relating to time-based sequences of data. Graph databases and/or time-series databases can facilitate (e.g., enable) the IMC 114 to apply more complex analysis on data (e.g., network measurement data, other network-related data, and/or other desired data stored in the graph database(s) and/or time-series database(s)) in an efficient way, and can enable the IMC 114 to determine, infer, identify, and/or extract more complicated patterns and/or relations (e.g., relationships between entities or data points) in the data. For example, the IMC 114 can utilize a graph database to efficiently (e.g., efficiently and/or automatically) find, determine, identify, or extract cycles or paths (e.g., paths indicating relationships) between two nodes (e.g., where each node can store attributes of data) in the graph database. As another example, the IMC 114 can utilize a time-series database to efficiently (e.g., efficiently and/or automatically) find, determine, identify, or extract the presence of a trend in time-series of data stored in the time-series database. The IMC 114, by employing non-relational databases, such as graph databases and time-series databases, to store at least some of the data (e.g., network measurement data, other network-related data, and/or other desired data) can enable the IMC 114 to efficiently (e.g., quickly, enhancedly, and/or optimally) process queries relating to subjects of interest to users (e.g., in real time or near real time; on the fly) without the IMC 114 having to process and store such data in a relational database in advance.

As disclosed, in addition to using and analyzing data obtained from internal data sources (e.g., from the data source component 224), the IMC 114 also can obtain data (e.g., external data) from one or more external data sources 116 (e.g., via one or more communication devices associated with the one or more external data sources) that can be associated with (e.g., communicatively connected to) the communication network 102. The one or more external data sources 116 can comprise, for example, weather information relating to the weather of a geographical region that can be obtained from a weather resource or application, geographical map information (e.g., city map, state map, country map, or map of another desired geographical region) that can be obtained from a map resource or application (e.g., City Map resource or GeoMap resource), road traffic information relating to vehicle traffic on the roads of a geographical region that can be obtained from a road traffic resource or application, social networking data associated with users (e.g., customers or subscribers) that can be obtained from one or more social network data sources, and/or other desired external information that can be obtained from another type of external data source.

Users (e.g., user 110 or user 112) can desire (e.g., want or need) to obtain information relating to subjects of interest to those users. The IMC 114 can receive information requests or queries from the users (e.g., via the communication devices 106 or 108 of the users, and/or via an interface of the interface component 202) and can desirably process the information requests or queries to provide information that can be responsive to the requests or queries. The subject of interest to the user can relate to, for example, various topics, attributes, events, people, customers (e.g., subscribers), issues, products, devices, communication networks, services, applications, or other matters or subjects of interest to the user. The information requests or queries can relate to, for example, whether there a path (e.g., relationship or edge, either direct or indirect) between a first entity (e.g., first person, organization, enterprise, business, or other entity) and a second entity (e.g., second person, organization, enterprise, business, or other entity), estimations or determinations of locations of communication devices associated with users, predictions of future locations of communication devices associated with users, determinations relating to performance indicators associated with areas associated with (e.g., covered by) the communication network 102 and ways to improve the performance indicators, determinations relating to which communication devices have better performance or coverage in a particular area(s) associated with a user, determinations relating to performance of devices (e.g., communication devices, network equipment, or other devices) in a particular area to facilitate planning of layout a portion of the communication network 102 and/or to facilitate determining which bundle of services to offer or sell to users in the particular area, determinations relating to potential or actual aggressive or malicious attacks on the communication network 102, predictions relating to potential or actual future aggressive or malicious attacks on the communication network 102, and/or other desired determinations, predictions, or estimations relating to data communications, users, communication devices, or the communication network 102, such as more fully described herein.

For instance, with regard to a user (e.g., user 110) who can desire to obtain information relating to a subject of interest, the user can utilize the communication device (e.g., 106) and/or the interface component 202 of the IMC 114 to create a query for information relating to the subject of interest. In some embodiments, the interface component 202 can provide one or more interfaces (e.g., interface screens), fields, and/or filters for the user to utilize to create the query. In accordance with various embodiments, the user can enter all or a portion of the query in a desired format (e.g., natural language format or other desired format) in a field of or associated with the interface component 202 and/or can select one or more query-related filters or terms to apply to the query.

In connection with the user (e.g., 110) providing the query, in some embodiments, the IMC 114, employing the authenticator component 204, can authenticate the user and/or associated communication device (e.g., user 110) to ensure that the user and/or communication device is authorized to access or receive the information desired (e.g., queried or requested) by the user and/or communication device. To facilitate managing access of users (e.g., users 110 and/or 112) and/or associated communication devices (e.g., communication devices 106 and/or 108) to the IMC 114 and services provided by the IMC 114 or associated communication network 102, the authenticator component 204 can be or can comprise an authentication, authorization, and accounting (AAA) module that can desirably manage (e.g., control) access of users to the IMC 114 and services provided by the IMC 114 or associated communication network 102. As part of such management of access, the authenticator component 204, employing the AAA module, can authenticate users (e.g., human users or other entities, which also may be devices or virtualized entities, such as virtual assistants (VAs)) and/or associated communication devices (e.g., 106 and/or 108) attempting to access the IMC 114 and associated services, determine which service(s), data, or resource(s) a user and/or communication device is authorized to access, and authorize the user and/or communication device to access a service(s), data, or resource(s) for which access is authorized, based at least in part on verification of authentication credentials associated with users and/or communication devices. The authenticator component 204, employing the AAA module, also can track and account for usage of the service(s), data, and/or resource(s) by the user and/or communication device, for example, to facilitate billing of the user for use of the service(s), data, and/or resource(s), management and allocation of services and resources, and/or performing other operations for other desired purposes.

For instance, the authenticator component 204 can request that the user and/or communication device provide one or more authentication credentials (e.g., valid authentication credentials) to the authenticator component 204 to authenticate or verify that user and/or communication device before allowing the query to be submitted or before allowing information responsive to the query to be provided by the IMC 114 to the user and/or communication device. If the user and/or communication device is not able to provide the one or more authentication credentials to the authenticator component 204 in accordance with the defined information management criteria and associated authentication algorithm(s) and criteria (e.g., after and up to a specified number of authentication attempts, as specified by the defined information management criteria), the authenticator component 204 can deny the user and/or communication device access to the queried or requested information. If the user and communication device is able to provide the one or more authentication credentials to the authenticator component 204 in accordance with the defined information management criteria and associated authentication algorithm(s) and criteria, the authenticator component 204 can allow the user and/or communication device access to the queried or requested information.

The interface component 202 can be or can comprise one or more gateways, one or more application programming interfaces (APIs), one or more graphical user interfaces (GUIs), one or more other interfaces, and/or one or more other tools that can enable users 110 and/or 112 and/or their communication devices 106 and/or 108 to interface and communicate with the IMC 114 to communicate requests or queries relating to subjects of interest to the IMC 114 and receive responsive information (e.g., query results) in response to their requests or queries and/or otherwise communicate with the IMC 114.

The request processor component 206 can comprise an intelligent request processing and routing module that can support and process a desirably wide variety of user queries or requests in various formats (e.g., different formats) and can convert (e.g., modify or translate) the queries or requests to appropriate database queries in formats (e.g., database-compatible formats) that can be understood by the databases (e.g., the relational databases 232, the non-relational databases 234, external databases (e.g., external relational or non-relational databases) associated with external data sources, or other databases). For instance, the request processor component 206 can receive, from a user (e.g., 110) or associated communication device (e.g., 106), a request or query comprising a group of terms in an unstructured format, such as a natural language format, or other format, can analyze the group of terms, and, based at least in part on the contents (e.g., search or query terms or other content) of the request or query, can convert the group of terms into a first format (e.g., a first structured format) that can be compatible with, understood by, and processable by a first database and/or a second format (e.g., a second structured format) that can be compatible with, understood by, and processable by a second database and/or a third format (e.g., a third structured format) that can be compatible with, understood by, and processable by a third database, and so on, with regard to each database to which the request or query is to be directed (e.g., presented), wherein such database(s) can comprise one more relational databases 232 and/or one or more non-relational databases 234.

For example, a user (e.g., 110) may ask, via a request or query, "Is there a path between a first entity and a second entity?" that can be in a natural language format. A path can mean a relationship or connection between the first entity (e.g., Alex) and the second entity (e.g., Bob). The request processor component 206 can analyze the terms of the request or query. Based at least in part on the analysis results, the request processor component 206 can convert or structure the terms, or a portion thereof, to form one or more respective queries in one or more respective formats associated with one or more respective databases to which the one or more respective queries are to be directed (e.g., terms of a request can be converted to a Cypher query to query data stored in a Neo4J database).

In some embodiments, the interface component 202 and/or request processor component 206 can present the user (e.g., 110) with options or filters (e.g., via a list or menu of options or filters) that the user can select to desirably tailor or filter the request or query, and the request or query (e.g., hybrid request for query) can comprise a group of terms, for example, in an unstructured format or other format, and one or more selected options or filters, which can be structured in a desired format. The options or filters can comprise or relate to, for example, a time or date (e.g., a particular time and/or date, or a range of times and/or range of dates), a location, a communication device (e.g., a type of communication device, a manufacturer or model of communication device, a communication technology associated with a communication device, or an entity, such as a business or enterprise, associated with a communication device), size of a device or other product, a service (e.g., a type of service), a product (e.g., a type of product), an event, and/or another desired attribute or attribute range.

In certain embodiments, as part of, and based at least in part on the results of, the analysis of the contents (e.g., search or query terms or other content) of the request or query, the request processor component 206 can determine one or more databases to which the request or query is to be directed. For instance, based at least in part on the analysis results, the request processor component 206 can determine (e.g., intelligently, contextually, automatically, or dynamically) one or more databases that can or may have information that can be responsive to the request or query of the user, and can communicate one or more queries to the one or more databases, wherein each query can be in the appropriate format for the particular database. As disclosed, respective databases can store respective data, which can comprise, for example, raw or processed network measurement data, raw or processed network-related data, raw or processed user or device related data, and/or other desired data.

The analytics component 208 and the AI component 210 can receive the respective data (e.g., network measurement data, other network-related data, device or user related data, and/or other data) from the one or more databases (e.g., one or more relational databases 232, non-relational databases 234, external databases, or other databases), wherein the one or more databases can provide the respective data to the analytics component 208 and/or the AI component 210 in response to the request (e.g., request or query) of the user (e.g., user 110). The analytics component 208 and/or AI component 210 can comprise a data analytics and predictive models module that can process all or a portion of the received data (e.g., network measurement data or other desired data) to identify and extract useful information from such data, can apply models (e.g., predictive models) to the information (e.g., useful or pertinent network measurement data or other data), and can provide, for example, estimates or predictions for attributes that can be of interest to the user (e.g., estimates or predictions regarding locations of communication devices associated with users based on RSRP data or other network measurement data; or other desired estimates or predictions for attributes of interest). In accordance with various embodiments, the analytics component 208 can perform various analytics on the data, either as part of determining certain analysis results that can be responsive to the request or as part of pre-processing the data to generate processed data that can be provided to (e.g., input to) the AI component 210 for further analysis (e.g., AI-based analysis).

The AI component 210 also can comprise an AI/ML clustering and prediction module that can build and/or train new AI or ML models (e.g., AI or ML clustering and/or predictive models of the model component 212) that can be utilized to desirably cluster data (e.g., the cluster component 214 can cluster data determined or inferred to be related to each other) and/or predicting (e.g., by the predictor component 216) one or more desired attributes of interest. The AI component 210 can perform an AI-based (e.g., AI and/or ML) analysis on the data (e.g., the data received from the databases, the data from the request, the pre-processed data from the analytics component 208) to train the AI-based models (e.g., train models of the model component 212 to learn or infer spatial-temporal patterns in or among items of data and/or learn or infer relationships between entities), determine patterns (e.g., spatial-temporal patterns) in or among respective portions of the data, determine or infer relationships between entities (e.g., relationships between a first entity and second entity and/or another entity (ies)), cluster of related elements (e.g., the cluster component 214 can cluster respective entities that are determined or inferred to have relationships with each other), and/or determine, infer, or predict (e.g., by the predictor component 216) other AI-based analysis results, based at least in part on the results of the AI-based analysis), such as more fully described herein. The cluster component 214 can employ (e.g., apply or utilize) desired clustering techniques and algorithms (e.g., graph clustering, agglomerative clustering, and/or other desired clustering techniques or algorithms) to determine, infer, or generate respective clusters of respective entities (e.g., entities that are related to each other and/or have certain same or similar characteristics with each other) based at least in part on the AI-based analysis results. An entity can be or comprise a user, a business, an enterprise, an organization, a subject, a topic, a pattern, an attribute, an application, a service, an item of data, a group of items of data, a location (e.g., geographical location, physical location, or logical location), a context, or other desired type of entity. The respective items of the data can be, can comprise, or can have respective (e.g., different) categorical variables can play a significant and desirable role in clustering of data and predictive models using such data, as performed by the AI component 210 and its associated AI-based models. The AI component 210 and its associated AI-based models can analyze and utilize these respective categorical variables associated with the respective items of data to determine or infer relevant patterns (e.g., spatial-temporal patterns in or among the items of data) that can relate to respective groups of users and/or devices (e.g., communication devices or other devices), such as more fully described herein.

Figure 3:
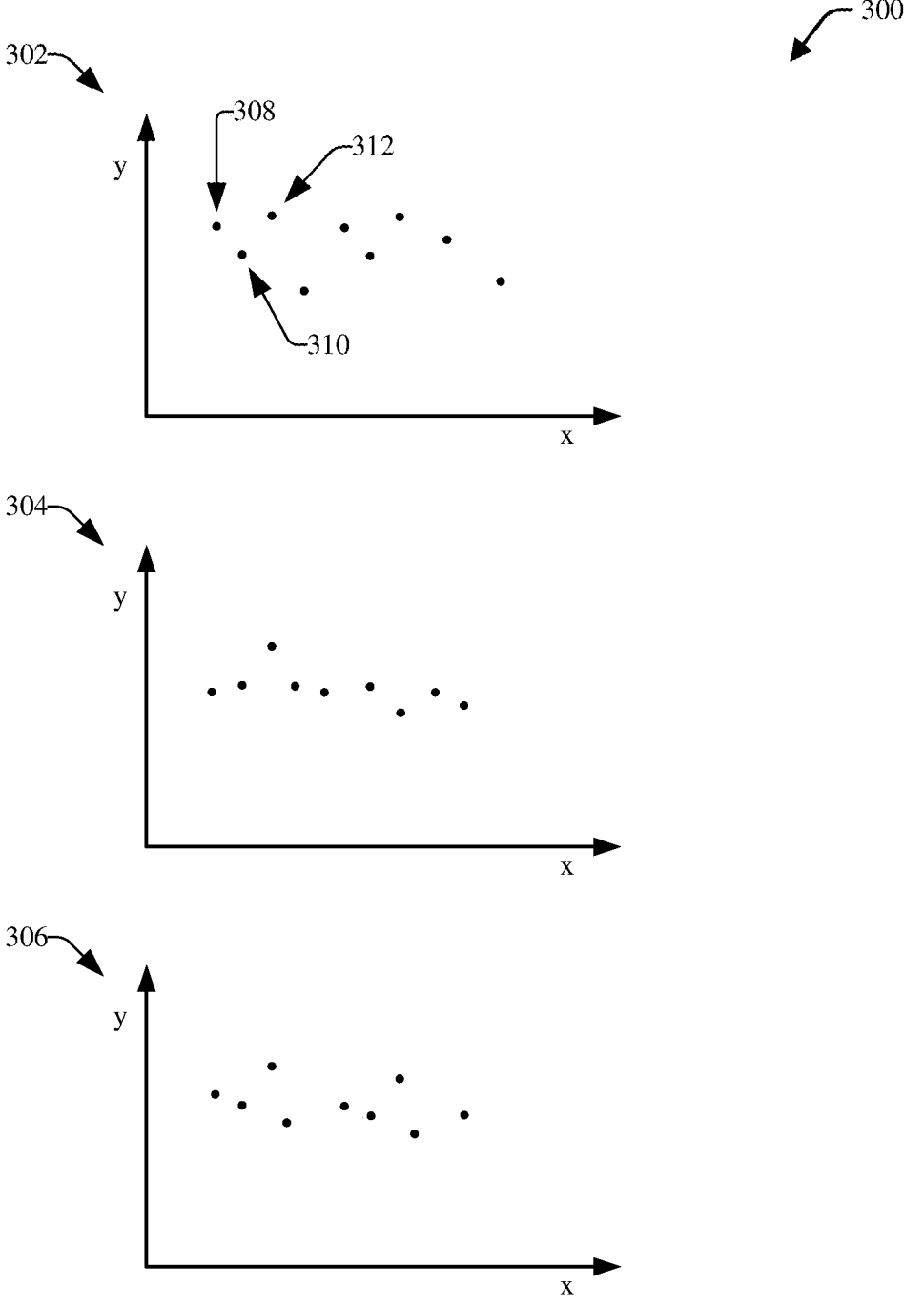
FIG. 3 presents a diagram of example patterns that can be determined or inferred based at least in part on an artificial intelligence (AI)-based analysis performed on the data, in accordance with various aspects and embodiments of the disclosed subject matter.
Figure 4:
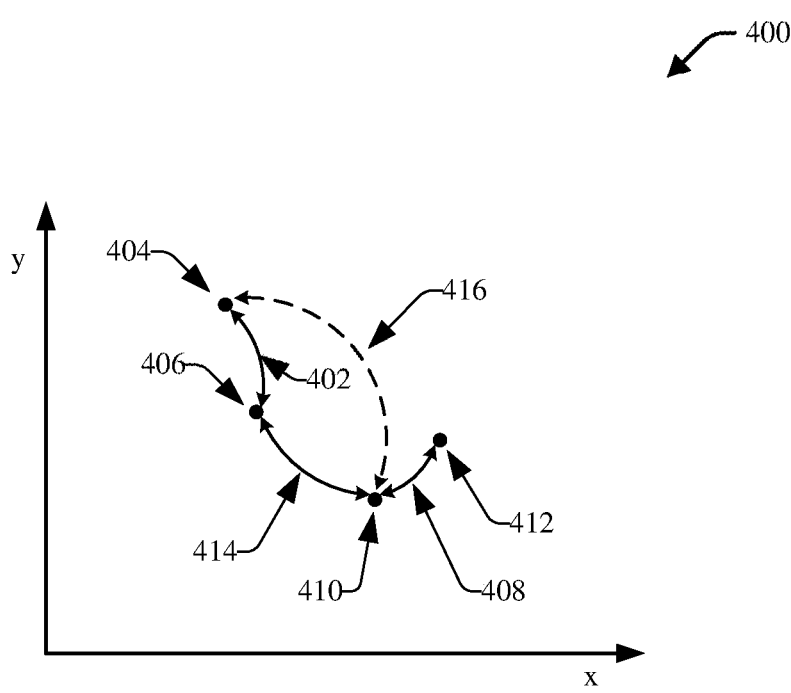
FIG. 4 presents a diagram of example relationships between entities that can be determined or inferred based at least in part on an AI-based analysis performed on the data, in accordance with various aspects and embodiments of the disclosed subject matter.
Figure 5:
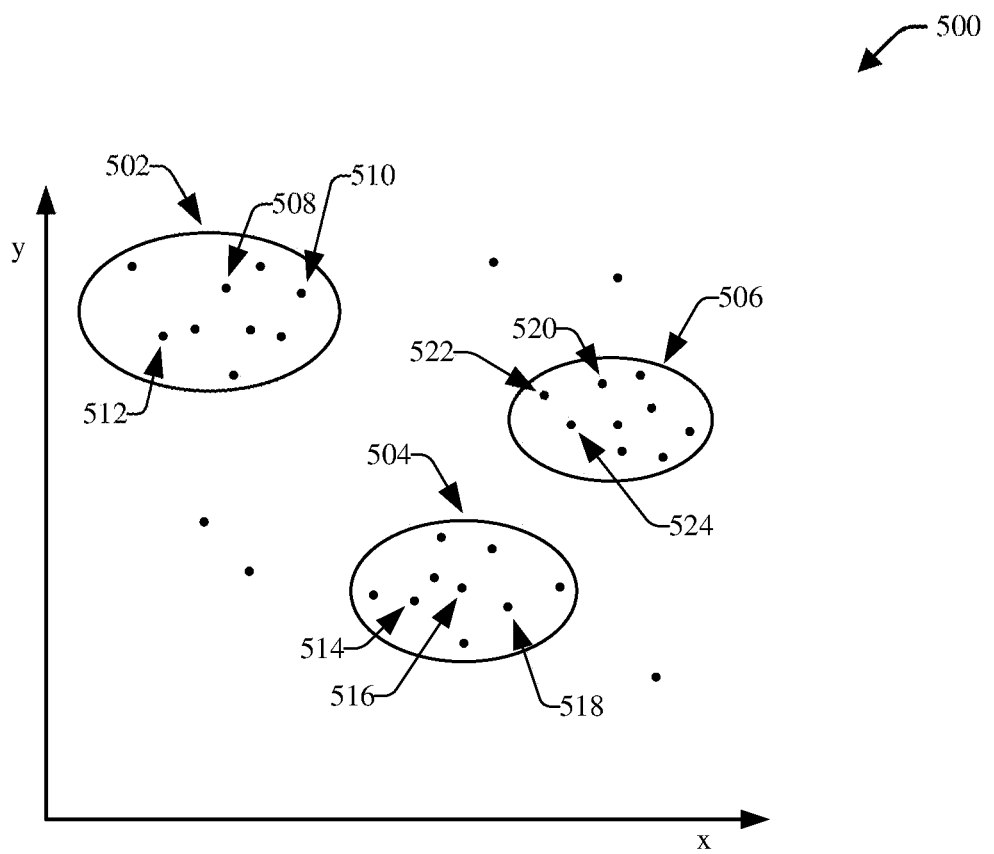
FIG. 5 presents a diagram of example clustering of entities that can be determined or inferred based at least in part on an AI-based analysis performed on the data, in accordance with various aspects and embodiments of the disclosed subject matter.

Referring briefly to FIGS. 3, 4, and 5 (along with FIGS. 1 and 2), FIG. 3 presents a diagram of example patterns 300 (e.g., spatial-temporal patterns) that can be determined or inferred by the AI component 210 based at least in part on an AI-based analysis performed on the data, FIG. 4 presents a diagram of example relationships between entities 400 (e.g., paths or edges) that can be determined or inferred by the AI component 210 based at least in part on an AI-based analysis performed on the data, and FIG. 5 presents a diagram of example clustering of entities 500 that can be determined or inferred by the AI component 210 based at least in part on an AI-based analysis performed on the data, in accordance with various aspects and embodiments of the disclosed subject matter. For instance, based at least in part on the results of an AI-based analysis performed by the AI component 210 on the data associated with the user request, the AI component 210 can determine or infer one or more patterns, such as pattern 302, pattern 304, and/or pattern 306, in or among the data. One or more of these patterns can be spatial and/or temporal in nature such that there can be a spatial component (e.g., space or location related attribute) and/or time-based component (e.g., time-related attribute) to the pattern(s). For instance, based at least in part on and/or depending in part on the AI-based analysis results, the AI component 210 can determine and generate a spatial-temporal pattern (e.g., pattern 302), which can be a graphical representation of the spatial-temporal pattern, that can comprise data points (e.g., data points 308, 310, and 312, and the other data points depicted in the pattern 302) plotted with respect to a first axis (e.g., x-axis) on the graph of the pattern (e.g., pattern 302) based on a time-based component associated with the respective data points and plotted with respect to a second axis (e.g., y-axis) on the graph of the pattern based on a spatial component associated with the respective data points, wherein the AI component 210 can determine, identify, or infer a particular pattern (e.g., a spatial-temporal pattern that can be of significance or interest with respect to the request of the user) in or among the data points in the pattern and/or in the underlying data that was analyzed to determine and generate the data points plotted on the graph comprising the pattern.

With further regard to the example relationships between entities 400 of FIG. 4, based at least in part on the results of an AI-based analysis performed by the AI component 210 on the data associated with the user request, the AI component 210 can determine or infer one or more relationships (e.g., edges or paths) between entities, such as, for example, a relationship 402 between a first entity 404 and a second entity 406, a relationship 408 between a third entity 410 and a fourth entity 412, a relationship 414 between the second entity 406 and the third entity 410, and/or another relationship(s) between entities. The AI component 210 also can determine, identify, or infer more indirect or remote relationships between entities (e.g., indirect relationship 416 between the first entity 404 and the third entity 410 based at least in part on the first entity 404 and third entity 410 having respective relationships to the second entity 406) when such indirect or remote relationships between entities, while not considered direct relationships, are sufficiently strong or significant enough to satisfy the defined information management criteria relating to determining the existence of relationships between entities. The relationships between two entities can involve entities of the same type (e.g., relationship between two users, relationship between two patterns, relationship between two topics, or relationship between two communication devices) or can involve entities of different types (e.g., relationship between a user and a pattern, relationship between a user and a geographic region, relationship between a user and a communication device, relationship between a first type of communication device and a second type of communication device, or relationship between a user (or associated communication device) and a geographical location).

With further regard to the example clusters of entities 500 of FIG. 5, based at least in part on the results of an AI-based analysis performed by the AI component 210 on the data associated with the user request, the AI component 210 (e.g., employing the cluster component 214) can determine or infer one or more clusters of entities, such as, for example, cluster 502, cluster 504, and/or cluster 506, which can represent respective clusters of entities (e.g., data points 508, 510, and 512, and the other data points depicted in the cluster of entities 502; data points 514, 516, and 518, and the other data points depicted in the cluster of entities 504; and/or data points 520, 522, and 524, and the other data points depicted in the cluster of entities 506). The cluster component 214, employing a desired clustering technique(s) and algorithm(s), can cluster a group of entities together to form a cluster of entities when the entities of the group satisfy clustering criteria (of the defined information management criteria) that can indicate the entities have a sufficiently close relationship to each other with regard to one or more desired attributes or factors. For example, when the cluster component 214 determines that certain data points (e.g., data points associated with or representative of entities) plotted on a graph are in relatively close proximity to each other on the graph, as compared to other data points plotted on the graph, the cluster component 214 can cluster those certain data points together to form a cluster of data points. As another example, when the AI component 210 identifies a pattern (e.g., spatial-temporal) in certain data points plotted on a graph, the cluster component 214 can cluster the data points associated with the pattern to form a cluster of data points.

With further regard to FIGS. 1 and 2, in certain embodiments, as part of or in connection with the data analysis by the analytics component 208 and/or AI component 210, the IMC 114 can employ external computing and/or analysis resources 118 that can perform analysis on the data, or portion thereof, and/or other data available to the external computing and/or analysis resources 118 and relevant (e.g., determined to be relevant) to the request of the user (e.g., 110). In some embodiments, the external computing and/or analysis resources 118 can generate, train, and/or provide one or more models (e.g., AI, ML, predictive, or clustering models, or other desired type of model) to the IMC 114 (e.g., to the AI component 210 of the IMC 114) for use in performing an analysis (e.g., AI-based analysis performed by the AI component 210) on the data, perform analysis on data (e.g., on behalf of the IMC 114) in connection with the request of the user, and/or determine, generate, and/or provide (e.g., communicate or present) visualizations based at least in part on the analysis of data by the external computing and/or analysis resources 118 in connection with the request of the user. The external computing and/or analysis resources 118 can comprise or relate to, for example, a mapping-related computing and/or analysis resource(s) (e.g., Google Maps, GeoJSON, Military Grid Reference System (MGRS), or other type of geographical or mapping related resource), a model (e.g., AI-based model) generation and/or training resource, and/or another desired type of computing and/or analysis resource.

In some embodiments, the analytics component 208 can comprise a collaborative data analysis and data fusion module that can process and/or combine (e.g., synthesize or integrate) all or a desired portion of the data obtained from the one or more databases (e.g., one or more relational databases 232, non-relational databases 234, external databases, or other databases) in response to the request of the user (e.g., 110), analytics results (e.g., from the analytics component 208) determined in response to the request, and/or AI-based analysis results (e.g., from the AI component 210, including the AI/ML clustering and prediction module) determined in response to the request, and/or other data generated or obtained by or on behalf of the IMC 114 in response to the request to produce responsive results (e.g., combined, synthesized, integrated, and/or summarized responsive results) to the request that can provide an enhanced and informative insight regarding or related to the behavior of users and devices, such as more fully described herein.

The visualizer component 218 can present (e.g., display, communicate, audially emit, haptically emit, or otherwise present), via the interface component 202, the responsive results (e.g., final results) to the request to the user (e.g., 110) via the communication device (e.g., 106) of the user and/or an interface of the interface component 202. The responsive results presented by the visualizer component 218 can provide the user with an enhanced (e.g., improved or optimized) insight regarding the subject of interest to the user and/or enhance the decision-making process of the user with regard to the subject of interest.

The event predictor component 220 and the notification component 222 can be or can comprise an automatic event/ change identification and/or prediction and alarming module that can utilize advanced AI-based models (e.g., of and in conjunction with the AI component 210) and data analytics techniques and algorithms (e.g., of and in conjunction with the analytics component 208 and/or AI component 210) to identify, determine, detect, infer, or predict significant events (e.g., events that are or may be of interest to the user (e.g., 110) or another entity) and/or identify, determine, detect, infer, or predict any significant change in a user and/or device pattern (e.g., a significant change in a spatial-temporal pattern relating to one or more users and/or one or more communication devices or other devices), based at least in part on the responsive results to the request of the user or other data or data analysis results performed on data by the event predictor component 220 and/or the notification component 222 in connection with the request of the user, such as more fully described herein. The notification component 222 can generate and present (e.g., via the interface component 202) a notification message that can notify the user about any significant event or significant change in a user and/or device pattern identified by the event predictor component 220 and/or notification component 222 and/or provide the user (e.g., via the communication device (e.g., 106) associated with the user) with information related to such significant event or significant change. The analysis performed by the event predictor component 220 and/or notification component 222 (and/or AI component 210 and/ or analytics component 208 in conjunction therewith) can be desirable (e.g., useful, wanted, and/or significant) for a number of different purposes, including, for example, detecting security attacks against the communication network 102, determining allocation of network resources of the communication network 102, determining whether to instantiate and/or a location at which to instantiate, edge network resources or functions (e.g., network slices, or an instantiated version of the IMC 114) at a particular edge of the communication network 102, and/or another desired purpose.

In some embodiments, the IMC 114, employing a post-processing module, can desirably process information, such as responsive results to requests of users (e.g., user 110) and/or other information, before providing (e.g., communicating or otherwise presenting) the information to the user (e.g., 110) via the interface component 202 and/or communication device (e.g., 106) associated with the user. For instance, the IMC 114, employing the post-processing module, can anonymize (e.g., using a desired anonymization technique or algorithm) the information in the responsive results determined by the IMC 114 in response to the request by the user (e.g., 110) to prevent or inhibit the user or other users from being able to identify a particular person or other entity associated with the information in the responsive results, when such anonymization can be desired by the defined information management criteria.

Figure 6:
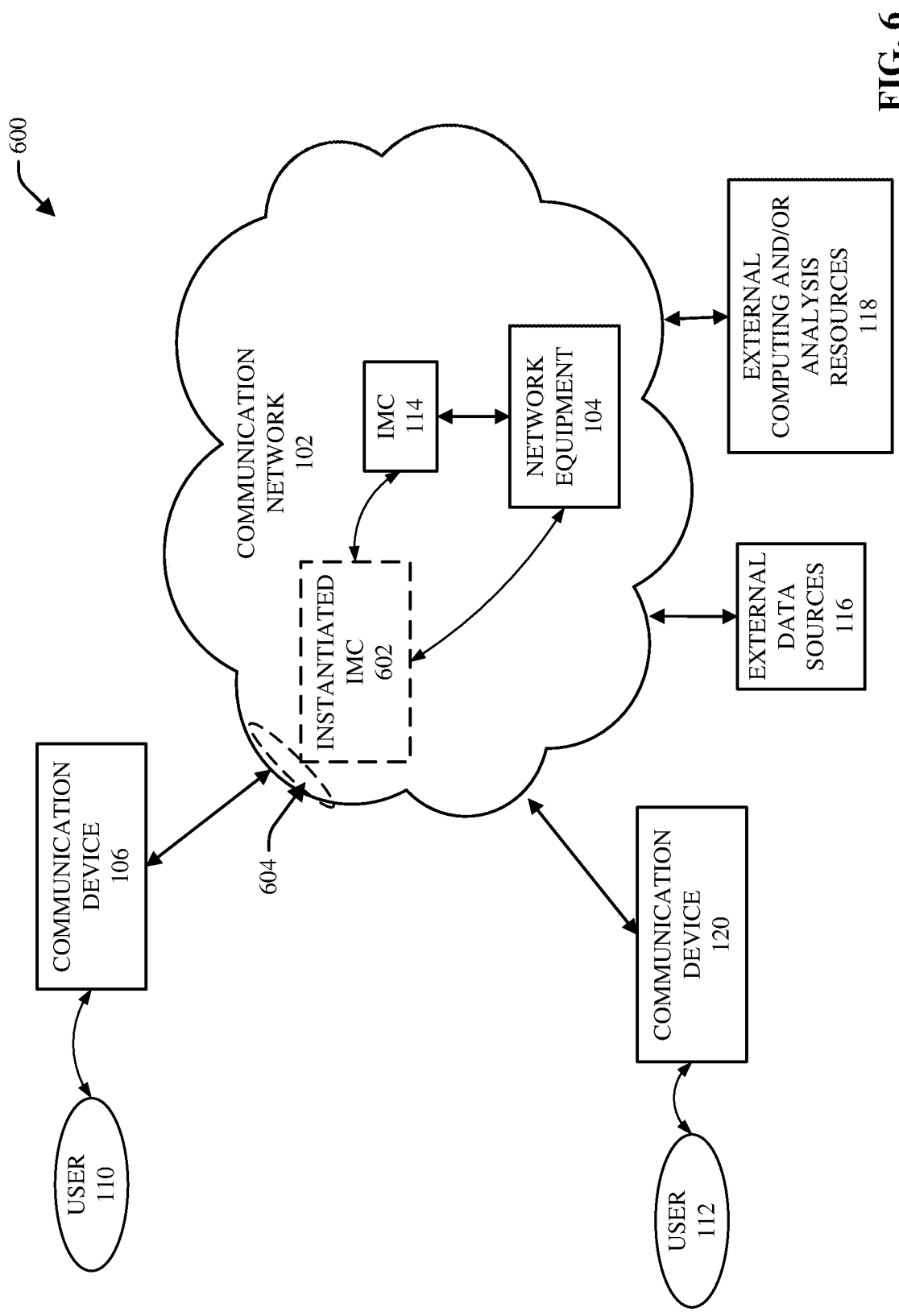
FIG. 6 depicts a block diagram of an example system that can generate, instantiate, and/or virtualize an instantiated IMC at an edge of the communication network to provide desired services with enhanced performance and lower latencies, in accordance with various aspects and embodiments of the disclosed subject matter.

Referring briefly to FIG. 6 (along with FIGS. 1 and 2), FIG. 6 depicts a block diagram of an example system 600 that can generate, instantiate, and/or virtualize an instantiated IMC 602 at an edge of the communication network 102 to provide desired services (e.g., processing and responding to requests and queries of users relating to subjects of interests to the users; and/or other desired services) with enhanced (e.g., improved, faster, more efficient, and/or optimized) performance and lower (e.g., reduced or minimized) latencies, in accordance with various aspects and embodiments of the disclosed subject matter. In some embodiments, the instantiated IMC 602 can be generated (e.g., created), instantiated, and/or virtualized as part of a network slice being generated, instantiated, and/or virtualized by the IMC 114 for use by the user (e.g., user 110) and associated communication device (e.g., communication device 106) in connection with providing a desired service to the user and associated communication device.

To facilitate enhancing performance of providing the desired service to the user (e.g., user 110) and associated communication device (e.g., communication device 106) and reducing latency associated therewith and/or to satisfy a desired (e.g., a specified or applicable) QoS, QoE, latency parameter, or other communication quality parameter associated with provision of the service, the IMC 114 can determine that it can be desirable to generate, instantiate, and/or virtualize the instantiated IMC 602 in a particular location (e.g., physical location or logical location) at an edge 604 of the communication network 102 that can be in relatively close proximity (e.g., physical proximity or logical proximity) to the communication device 106 and/or associated user 110 (e.g., relatively close proximity to the location of the communication device 106 and/or user 110), or in relatively close proximity to another desirable location (e.g., another location that can be relatively close in proximity to data to be retrieved or obtained by the instantiated IMC 602), in connection with providing the service to the communication device 106 and/or the associated user 110. Accordingly, the IMC 114, employing the network equipment 104, can generate, instantiate, and/or virtualize the instantiated IMC 602 at the particular location (or the other desirable location) at the edge 604 of the communication network 102. The instantiated IMC 602 can comprise all or a desired portion of the components and functions of the IMC 114, and can perform all or a desired portion of the operations and analysis on data that the IMC 114 can or would otherwise have performed on the data. In some embodiments, the instantiated IMC 602 can perform a portion of the operations or analysis on data (e.g., time-sensitive operations or analysis on data), and the IMC 114 can perform another portion of the operations or analysis on data (e.g., in connection with processing and responding to a request received from the user). The instantiated IMC 602 also can have access to the same data (e.g., network measurement data, network-related data, device or user related data, external data, or other data) that the IMC 114 can have available to it, and the instantiated IMC 602 also can have access to and exchange information with the external data sources 116 and the external computing and/or analysis resources 118.

With further regard to FIGS. 1 and 2, there can be a variety of uses and purposes for various aspects and features of the disclosed subject matter. For instance, users (e.g., user 110), such as network operators, can utilize the IMC 114, including its framework, components, functions, and resources, to determine or derive one or more spatial-temporal patterns for different performance indicators (e.g., KPIs) based at least in part on the results of an analysis (e.g., AI-based analysis) of data, such as network measurement data, network-related data, user or device data, external data, or other desired data. Determining or deriving such spatial-temporal patterns for different performance indicators can enable or assist such users to quickly and efficiently detect or identify areas (e.g., geographical areas and/or network equipment associated with such geographical areas) that can have undesirably low performance and determine or identify the root cause of the problem that can be causing such low performance, which can enable the users to resolve the problem more quickly.

Figure 7:
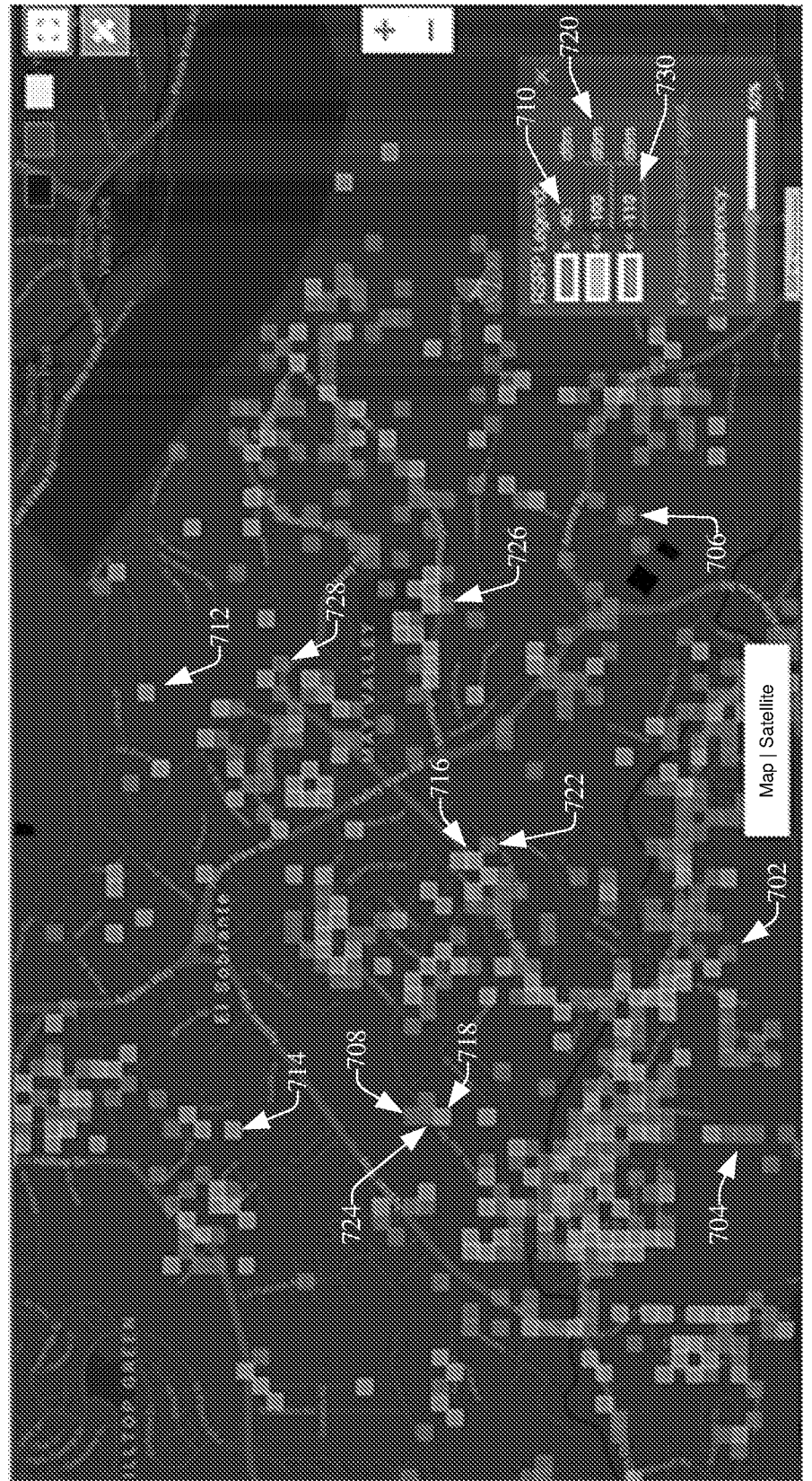
FIG. 7 illustrates a diagram of example received signal received power (RSRP) data for respective cells or base stations where the IMC can utilize categorical variables to cluster network measurements, in accordance with various aspects and embodiments of the disclosed subject matter.
Figure 8:
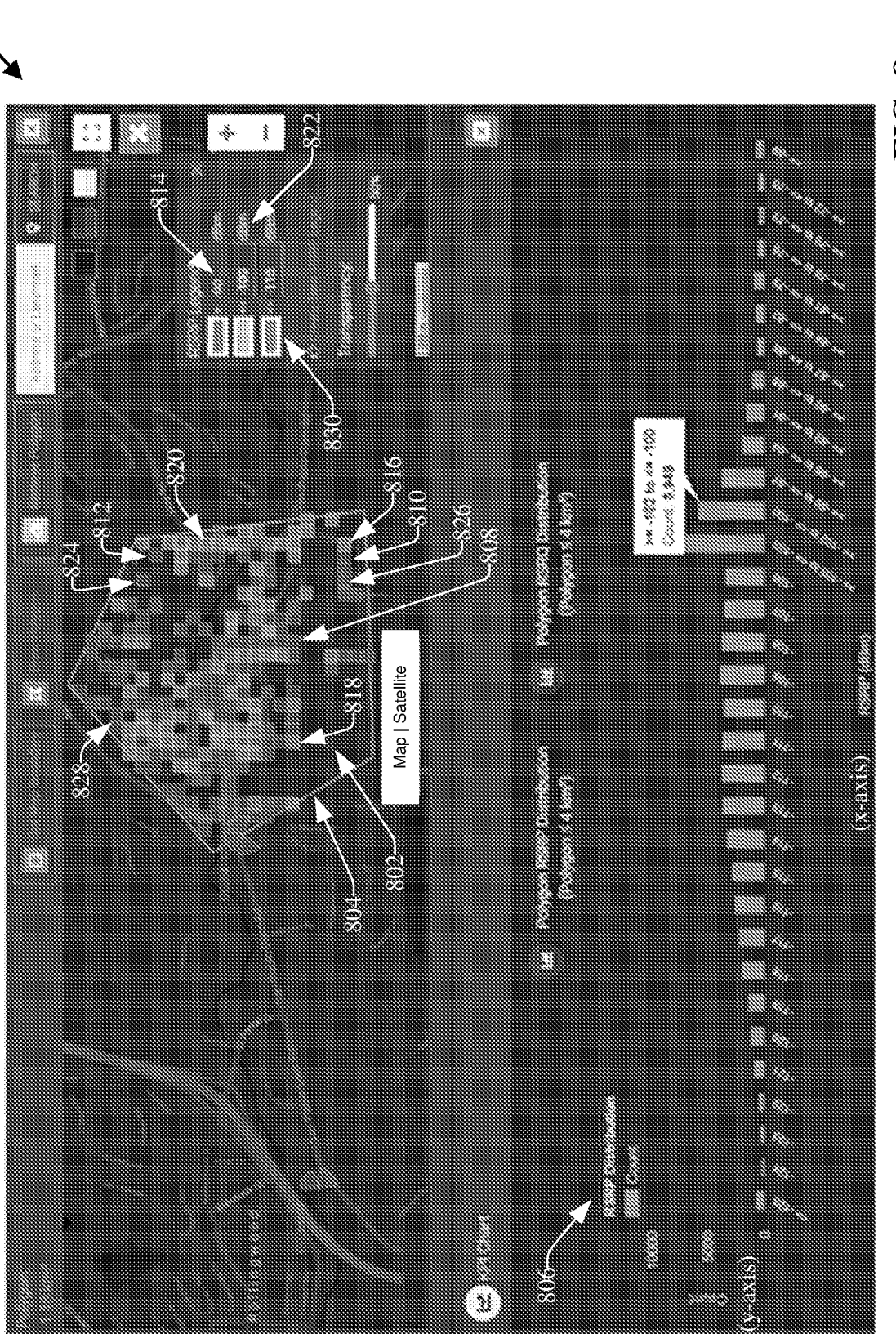
FIG. 8 illustrates a diagram of example RSRP data for respective cells or base stations for a specific area along with the distribution of RSRP for that specific area, in accordance with various aspects and embodiments of the disclosed subject matter.

In that regard, referring briefly to FIGS. 7 and 8 (along with FIGS. 1 and 2), FIGS. 7 and 8 illustrate diagrams of example spatial-temporal KPIs with desirably high resolution for specific areas. FIG. 7 illustrates a diagram of example RSRP data 700 for respective cells or base stations (e.g., eNodeBs) where the IMC 114 can utilize categorical variables, such as, for example, cell or base station names, to cluster network measurements, in accordance with various aspects and embodiments of the disclosed subject matter. The example RSRP data 700 presented in the diagram of FIG. 7 can be for the coverage area of a group of specific cells or base stations when a list of cells or base stations (e.g., list of names of cells or base stations) are provided as input (e.g., based on, and in response to, a query from a user) to the AI component 210 and/or analytics component 208 of the IMC 114. The diagram of the example RSRP data 700 can comprise certain RSRP data, such as RSRP data points 702, 704, 706, and 708, and other similarly displayed (e.g., same colored) RSRP data points in the diagram, that can indicate or represent good RSRP measurements (e.g., RSRP that can be greater than −90 dBm, as indicated at reference numeral 710). The diagram of the example RSRP data 700 also can comprise some RSRP data, such as RSRP data points 712, 714, 716, and 718, and other similarly displayed (e.g., same colored) RSRP data points in the diagram, that can indicate or represent relatively fair quality RSRP measurements (e.g., RSRP that can be less than or equal to −100 dBm, as indicated at reference numeral 720). The diagram of the example RSRP data 700 further can comprise other RSRP data, such as RSRP data points 722, 724, 726, and 728, and other similarly displayed (e.g., same colored) RSRP data points in the diagram, that can indicate or represent relatively poor quality RSRP measurements (e.g., RSRP that can be less than or equal to −110 dBm, as indicated at reference numeral 730).

FIG. 8 illustrates a diagram of example RSRP data 800 for respective cells or base stations for a specific area 802, which can be selected and/or demarcated by the example drawn polygon 804, along with the distribution of RSRP 806 for that specific area, in accordance with various aspects and embodiments of the disclosed subject matter. The user (e.g., network operator) can utilize the tools of the interface component 202 to select the specific area 802 (e.g., to draw the polygon 804). It is to be appreciated and understood that the user can draw or select the area to be virtually any desired shape (e.g., regular or irregular shape) or size.

The diagram of the example RSRP data 800 can comprise certain RSRP data, such as RSRP data points 808, 810, and 812, and other similarly displayed (e.g., same colored) RSRP data points in the diagram, that can indicate or represent good RSRP measurements (e.g., RSRP that can be greater than −90 dBm, as indicated at reference numeral 814). The diagram of the example RSRP data 800 also can comprise some RSRP data, such as RSRP data points 816, 818, and 820, and other similarly displayed (e.g., same colored) RSRP data points in the diagram, that can indicate or represent relatively fair quality RSRP measurements (e.g., RSRP that can be less than or equal to −100 dBm, as indicated at reference numeral 822). The diagram of the example RSRP data 800 further can comprise other RSRP data, such as RSRP data points 824, 826, and 828, and other similarly displayed (e.g., same colored) RSRP data points in the diagram, that can indicate or represent relatively poor quality RSRP measurements (e.g., RSRP that can be less than or equal to −110 dBm, as indicated at reference numeral 830).

The example distribution of RSRP 806 for that specific area 802 can comprise RSRP (measured in dBm) along the first axis (e.g., x-axis) and the count along the second axis (e.g., y-axis) where the respective numbers of RSRPs for each desired RSRP can be presented in the example distribution of RSRP 806. The data (e.g., visual data) presented in the diagram of example RSRP data 700 of FIG. 7 and the diagram of example RSRP data 800 of FIG. 8 and insights that can be derived from such data can be useful to users (e.g., network operators and engineers), for example, to collectively analyze network device performances, and this can enable or facilitate a more data-driven collaboration with vendors or device manufacturers to improve the performance of network devices.

The determining or deriving spatial-temporal patterns of different KPIs for each network device and/or operating system (e.g., by the IMC 114 using the techniques described herein and such as illustrated in FIGS. 7 and 8 and described herein) also can be useful and helpful for device manufacturers and network device vendors. For instance, such data (e.g., spatial-temporal patterns of different KPIs) can provide users (e.g., device manufacturers and network device vendors) insight regarding how the device and/or operating system behave, and can enable or help users to identify potential root causes of problems (e.g., undesirably low performance) and resolve such issues. For example, users (e.g., vendors or other users) can utilize the IMC 114 to determine specific devices that are to have their operating system upgraded, upgrade the operating system of those specific devices, and evaluate the performance of the devices, including the specific devices with the upgraded operating system, operating in the communication network, in real time or near real time (e.g., on the fly), to facilitate determining whether the upgrade of the operating system of the specific devices is improving performance and, if so, to what degree is the upgrading of the operating system is improving performance. This can desirably (e.g., suitably, enhancedly, or optimally) reduce their upgrading cycle and can be beneficial to such users, and also can generate revenue for the entity (e.g., network operator, business, or enterprise) that is providing the services and framework of or associated with the IMC 114.

As another example use or application of the various aspects and features of the disclosed subject matter (e.g., the IMC 114 and its framework and techniques), the IMC 114 determine or derive spatial-temporal patterns and use categorical data to visualize QoS indicators (e.g., QoS indicators relating to retainability and/or accessibility) for each desired area covered by the communication network 102, based at least in part on the results of an analysis (e.g., AI-based analysis) of data, such as network measurement data, network-related data, user or device data, external data, or other desired data. Such spatial-temporal patterns can illustrate (e.g., visually illustrate) and/or provide insight regarding which type of communication device has better coverage and/or better performance than another type of communication device with regard to a particular area. Users (e.g., sales representative) can utilize such spatial-temporal patterns to enhance offering and sales of communication devices to customers or potential customers. For instance, a user (e.g., sales representative) can show a customer (or potential customer) that a first type of communication device (e.g., a first model of communication device of a first device manufacturer) can provide better coverage and/or better performance than a second type of communication device (e.g., a second model of communication device of a second device manufacturer or the first device manufacturer) in a particular area where the customer (or potential customer) spends the majority of his or her time. As a result, the customer can acquire a better communication device and/or wireless service plan with better performance, and this can directly increase customer satisfaction.

Also, users (e.g., sales representatives, or network planners, engineers, or operators) having knowledge regarding the respective performances and respective coverage qualities of respective types of communication devices for respective areas can enable or help such users to desirably plan the communication network 102 (e.g., plan the layout of network equipment and resources, plan the configuration of network equipment and resources, and/or plan the selection of network equipment and resources) and/or sell a bundle of services to a group of customers (e.g., group of customers working in a commercial building, working in a factory, or working in another area and/or type of working environment). For instance, based at least in part on the spatial-temporal patterns relating to QoS indicators or other performance indicators, a user (e.g., sales representative) can identify a particular type of communication device that can provide better performance and/or better coverage for a particular area and/or work environment where a group of customers typically work than other types of communication devices, and can use such relative performance/coverage information to show the group of customers (or a customer acting on behalf of the group of customers) that the particular type of communication device can perform better for them and/or provide better coverage for them than the other types of communication devices. As another example, a user (e.g., network planner, engineer, or operator) can utilize such information regarding spatial-temporal patterns to identify an area that has relatively lower performance or coverage for one or more types of communication devices and can plan the design (e.g., plan upgrades in the design) of the communication network to improve the performance of the communication network with respect to the one or more types of communication devices that were experiencing relatively lower performance or coverage.

Users (e.g., employee of a communication network operator or communication device seller) can utilize and leverage data, such as the spatial-temporal patterns relating to quality of performance of coverage of communication devices and/or quality of performance of network equipment, to acquire better deals with device manufacturers and network device vendors. For example, such users can use such data to argue and show that a first type of device has a worse performance than a second type of device in the same area. As a result, such users can negotiate with the device manufacturer or vendors and reach an agreement for a lower price for the first type of device than such users otherwise may have gotten without such data.

In some embodiments, the IMC 114 can analyze the data stored in the relational databases 232 and non-relational databases 234, in addition to data obtained from external data sources 116 (e.g., social networking data associated with users that can be obtained from social networks), and, based at least in part on the results of such analysis (e.g., AI-based analysis and/or analytics) to determine, infer, or discover (e.g., uncover) sophisticated spatial-temporal patterns and behaviors regarding how a group of users interact with each other. A user desiring such information as a subject of interest can use the IMC 114, for example, to have the IMC 114 (e.g., AI component 210 and/or analytics component 208) perform or apply advanced graph-analytic techniques to the spatial-temporal patterns or the underlying data, and from such analysis, the IMC 114 can identify threats or potential threats in real time or near real time that can be desirable (e.g., significant, wanted, critical, or important) from various different perspectives.

In certain embodiments, a user, submitting a query to the IMC 114, also can use the IMC 114 (e.g., AI component 210 and/or analytics component 208) to perform the AI-based analysis and/or analytics, including performing desirably advanced graph and time-series analytics and deep learning techniques, on the data stored in the databases (e.g., relational databases 232 and non-relational databases 234) and/or external data obtained from external data sources 116, and, based at least in part on the results of such analysis, the IMC 114 can determine, identify, infer, or discover aggressive or malicious, or potentially malicious, spatial-temporal data traffic patterns and can determine, identify, or infer how this aggressive or malicious, or potentially malicious, data traffic represented in the spatial-temporal patterns can affect a group of different network devices of the communication network 102. For instance, the aggressive or malicious, or potentially malicious, spatial-temporal data traffic patterns can indicate certain areas of the communication network 102 and network equipment associated with the certain areas that can or may be experiencing aggressive and/or malicious data traffic from undesirably aggressive or malicious communication devices and/or locations of the aggressive or malicious communication devices (e.g., communication devices engaging in aggressive and/or malicious communicating of signals (e.g., signal storms and/or distributed denial of service (DDOS) attacks)). The IMC 114, by determining and extracting such spatial-temporal patterns, can utilize such patterns, or enable users to utilize such patterns, to identify and mitigate (e.g., take mitigation action to stop, minimize, or otherwise mitigate) a current aggressive or malicious attack on the communication network 102, or portion thereof, and/or predict future aggressive or malicious attacks on the communication network 102, or portion thereof, to enable users (e.g., network operators, engineers, or other network personnel) to take preparatory or preventive actions to enhance the communication network 102 to prevent or mitigate such future aggressive or malicious attacks on the communication network 102, or portion thereof.

Users (e.g., network personnel) also can utilize the IMC 114, including the AI component 210 and model component 212, to enable developing collaborative AI-based models (e.g., AI, ML, predictive, or clustering models) with vendors, where the users and vendors can share anonymized data (e.g., including data anonymized by the IMC 114) with each other to develop and train enhanced (e.g., improved) AI-based models for use in determining or inferring spatial-temporal patterns relating to subjects of interest, relationships between entities, and/or other desired and useful analysis results. The sharing of anonymized data by such users and vendors potentially can produce a better dataset that can be used to better develop and train the AI-based models.

With further regard to FIG. 2, the operations manager component 226 can control (e.g., manage) operations associated with the IMC 114. For example, the operations manager component 226 can facilitate generating instructions to have components of the IMC 114 perform operations, and can communicate respective instructions to respective components (e.g., interface component 202, authenticator component 204, request processor component 206, analytics component 208, AI component 210, visualizer component 218, event predictor component 220, notification component 222, data source component 224, processor component 228, and data store 230) of the IMC 114 to facilitate performance of operations by the respective components of the IMC 114 based at least in part on the instructions, in accordance with the defined information management criteria and information management algorithms (e.g., pattern determination or inference algorithms, AI or ML algorithms, predictive algorithms, clustering algorithms, authentication algorithms, or other algorithms, as disclosed, defined, recited, or indicated herein by the methods, systems, and techniques described herein). The operations manager component 226 also can facilitate controlling data flow between the respective components of the IMC 114 and controlling data flow between the IMC 114 and another component(s) or device(s) (e.g., a communication device, a base station or other network equipment of the communication network, resources, data sources, applications, or other type of component or device) associated with (e.g., connected to) the IMC 114.

The processor component 228 can work in conjunction with the other components (e.g., interface component 202, authenticator component 204, request processor component 206, analytics component 208, AI component 210, visualizer component 218, event predictor component 220, notification component 222, data source component 224, operations manager component 226, and data store 230) to facilitate performing the various functions of the IMC 114. The processor component 228 can employ one or more processors, microprocessors, or controllers that can process data, such as information relating to users, entities, subjects, topics, attributes, network measurements, network operations, network equipment, communication devices, network data traffic, resources, applications, spatial-temporal patterns, relationships between entities, clustering relating to entities, external data obtained from external data sources, authentication credentials associated with communication devices or users, metadata, messages, parameters, threshold values, traffic flows, policies, defined information management criteria, algorithms (e.g., pattern determination or inference algorithms, AI or ML algorithms, predictive algorithms, clustering algorithms, authentication algorithms, or other algorithms, as disclosed, defined, recited, or indicated herein by the methods, systems, and techniques described herein), protocols, interfaces, tools, and/or other information, to facilitate operation of the IMC 114, as more fully disclosed herein, and control data flow between the IMC 114 and other components (e.g., a communication device, a base station or other network equipment of the communication network, resources, data sources, applications, or other type of component or device) associated with the IMC 114.

The data store 230 can store data in relational databases 232 and/or non-relational databases 234, and can store other desired data, such as described herein. The data store 230 can store data structures (e.g., user data, metadata), code structure(s) (e.g., modules, objects, hashes, classes, procedures) or instructions, information relating to users, entities, subjects, topics, attributes, network measurements, network operations, network equipment, communication devices, network data traffic, resources, applications, spatial-temporal patterns, relationships between entities, clustering relating to entities, external data obtained from external data sources, authentication credentials associated with communication devices or users, metadata, messages, parameters, threshold values, traffic flows, policies, defined information management criteria, algorithms (e.g., pattern determination or inference algorithms, AI or ML algorithms, predictive algorithms, clustering algorithms, authentication algorithms, or other algorithms, as disclosed, defined, recited, or indicated herein by the methods, systems, and techniques described herein), protocols, interfaces, tools, and/or other information, to facilitate controlling operations associated with the IMC 114. In an aspect, the processor component 228 can be functionally coupled (e.g., through a memory bus) to the data store 230 in order to store and retrieve information desired to operate and/or confer functionality, at least in part, to the interface component 202, authenticator component 204, request processor component 206, analytics component 208, AI component 210, visualizer component 218, event predictor component 220, notification component 222, data source component 224, operations manager component 226, processor component 228, and data store 230, or other component, and/or substantially any other operational aspects of the IMC 114.

With further regard to the AI component 210, the AI component 210 can perform an AI and/or ML analysis on data, such as network measurement data, network-related data, user or device related data, external data, and/or other desired data, such as more fully described herein. In connection with or as part of such an AI or ML analysis, the AI component 210 can employ, build (e.g., construct or create), and/or import, AI and/or ML techniques and algorithms, AI and/or ML models (e.g., trained models), neural networks (e.g., trained neural networks), and/or graph mining to render and/or generate predictions, inferences, calculations, prognostications, estimates, derivations, forecasts, detections, and/or computations that can facilitate determining spatial-temporal patterns relating to subjects of interest to users, determining relationships between entities, determining clusters relating to entities, and/or automating one or more functions or features of the disclosed subject matter, as more fully described herein. The AI and/or ML algorithms that can be utilized by the AI component 210 can comprise, for example, AI algorithms, ML algorithms, deep learning algorithms, reinforcement algorithms, graph mining algorithms, clustering algorithms, and/or other desired AI and/or ML type algorithms, or a desired combination thereof.

The AI component 210 can employ various AI-based or machine learning (ML)-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 210 can examine the entirety or a subset of the data (e.g., network measurement data, network-related data, user or device related data, external data, and/or other desired data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on))

schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, . . . , zn), to a confidence that the input belongs to a class, as by f(z)=confidence (class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

The systems and/or devices, including the aforementioned systems and/or devices, described herein have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 9-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 9 illustrates a flow chart of an example method 900 that can determine spatial-temporal informative patterns associated with users and associated devices associated with data networks, in accordance with various aspects and embodiments of the disclosed subject matter. The method 900 can be employed by, for example, a system comprising the IMC, a processor component (e.g., of or associated with the IMC), and/or a data store (e.g., of or associated with the IMC).

At 902, a first group of items of data that was stored in a first format in a first database and a second group of items of data that was stored in a second format in a second database can be analyzed, wherein the first group of items of data and/or the second group of items of data can comprise respective communication network-related data associated with the communication network and/or respective devices associated with the communication network. The IMC can receive the first group of items of data from the first database, which can store the first group of items of data in the first format. In some embodiments, the IMC can receive a request for desired information and/or a user search query from a communication device, or via an interface, associated with a user, wherein the request or search query can relate to a subject of interest to the user. The request or user search query can be in a request or query format (e.g., natural language format or other type of format). The IMC can convert the request or user search query (e.g., convert information contained in the request or user search query) into a first search query in a first query format associated with (e.g., utilized or understood by) the first database, and a second search query in a second query format associated with the second database.

The IMC can communicate the first search query, in the first query format, to the first database, and, in response to the first search query, the IMC can receive first search results, comprising the first group of items of data, from the first database. The IMC can communicate the second search query, in the second query format, to the second database, and, in response to the second search query, the IMC can receive second search results, comprising the second group of items of data, from the second database. In some embodiments, the first group of items of data and/or the second group of items of data can comprise the respective communication network-related data associated with the communication network and/or the respective devices (e.g., communication devices) associated with the communication network. In certain embodiments, the respective communication network-related data can comprise signal measurement data that can be representative of respective signal measurements associated with the respective devices, respective call records associated with the respective devices, respective performance indicators associated with the respective devices, user information relating to respective users associated with the respective devices, and/or other desired communication network-related data.

In some embodiments, the analysis of the first group of items of data and the second group of items of data can comprise an AI-based analysis that can be performed (e.g., by the AI component) on the first group of items of data and the second group of items of data, such as more fully described herein. In certain embodiments, the AI component can create, train, and/or use one or more AI-based (e.g., AI and/or ML) models, wherein the first group of items of data and the second group of items of data can be input to the one or more AI-based models to facilitate performing the AI-based analysis on the first group of items of data and the second group of items of data, and predicting or determining respective relationships between respective items of data and/or one or more spatial-temporal patterns in the first group of items of data and the second group of items of data.

At 904, based at least in part on the analysis results, one or more spatial-temporal patterns associated with the first group of items of data and the second group of items of data can be determined, wherein the one or more spatial-temporal patterns can relate to a subject of interest. Based at least in part on the analysis results, the IMC can determine the one or more spatial-temporal patterns associated with the first group of items of data and the second group of items of data. For instance, based at least in part on the AI-based analysis results, the IMC, employing the AI component, can infer or predict (e.g., infer or predict to a defined probability level) one or more spatial-temporal patterns associated with the first group of items of data and the second group of items of data, and the IMC can determine the one or more spatial-temporal patterns based at least in part on the inference or prediction, wherein the one or more determined spatial-temporal patterns can be the same as the one or more inferred or predicted spatial-temporal patterns, can comprise a portion of the one or more inferred or predicted spatial-temporal patterns, or can comprise adaptations of one or more of the inferred or predicted spatial-temporal patterns. The one or more spatial-temporal patterns can relate to the subject of interest, users, and/or devices associated with the users.

FIG. 10 depicts a flow chart of an example method 1000 that can determine spatial-temporal informative patterns relating to users and associated devices associated with data networks and/or determine relationships between entities, in accordance with various aspects and embodiments of the disclosed subject matter. The method 1000 can be employed by, for example, a system comprising the IMC, a processor component (e.g., of or associated with the IMC), and/or a data store (e.g., of or associated with the IMC).

At 1002, a search query in a particular format can be converted to generate respective search queries in respective search query formats associated with respective databases, wherein the respective search queries can relate to a subject of interest. The IMC can determine and generate the respective search queries in the respective search query formats, wherein the respective search query formats can be utilized by the respective databases. For instance, if the IMC receives a request or search query (e.g., a search query relating to a subject of interest to the user) in the particular format (e.g., natural language format or other type of format), the IMC can convert or translate the request or search query into the respective search queries in the respective search query formats that can correspond to the respective databases to which the respective search queries can be directed. The respective databases can comprise one or more relational databases and/or one or more non-relational databases (e.g., graph database and/or time-series database). The respective databases can be part of the communication network and/or can be associated with (e.g., communicatively connected to and/or accessible by) the communication network. In some embodiments, one or more of the databases can be an external database that can be external to the communication network.

At 1004, in response to the respective search queries directed to the respective databases, respective items of data can be received from the respective databases of or associated with the communication network, wherein the respective items of data can relate to the subject of interest. The respective databases can process or execute the respective search queries in the respective search query formats to search the respective databases for information responsive to the respective search queries, and can retrieve the respective items of data stored in the respective databases. The IMC can receive the respective items of data from the respective databases.

At 1006, the respective items of data can be analyzed, wherein the analysis can comprise an AI-based analysis of the respective items of data. The IMC, employing the analytics component and/or AI component, can perform various analysis on the data, including analytics and/or AI-based analysis, on the respective items of data, such as more fully described herein.

At 1008, based at least in part on the results of the analysis, one or more spatial-temporal patterns associated with the respective items of data and/or one or more relationships between entities can be determined, wherein the one or more spatial-temporal patterns and/or the one or more relationships between entities can relate to the subject of interest. Based at least in part on the analysis results, the IMC can determine the one or more spatial-temporal patterns associated with the respective items of data and/or the one or more relationships between entities. For instance, based at least in part on the AI-based analysis results, the IMC, employing the AI component, can infer or predict (e.g., infer or predict to a defined probability level) one or more spatial-temporal patterns associated with the respective items of data and/or the one or more relationships between entities, and the IMC can determine the one or more spatial-temporal patterns and/or the one or more relationships between entities based at least in part on the inference or prediction. The one or more determined spatial-temporal patterns can be the same as the one or more inferred or predicted spatial-temporal patterns, can comprise a portion of the one or more inferred or predicted spatial-temporal patterns, or can comprise adaptations of one or more of the inferred or predicted spatial-temporal patterns. The one or more spatial-temporal patterns can relate to the subject of interest, users, and/or devices associated with the users.

At 1010, a responsive result, comprising information relating to the one or more spatial-temporal patterns and/or the one or more relationships between entities, a desired portion of the underlying data (e.g., a desired portion of the network measurement data, network-related data, user or device related data, external data, and/or other data), and/or other information relating to the subject of interest, can be presented to the user and/or communication device associated with the user. The IMC, employing the visualizer component, interface component, and/or another component(s) of the IMC, can present the responsive result (e.g., result that can be responsive to the query) to the user and/or the communication device associated with the user.

Figure 11:
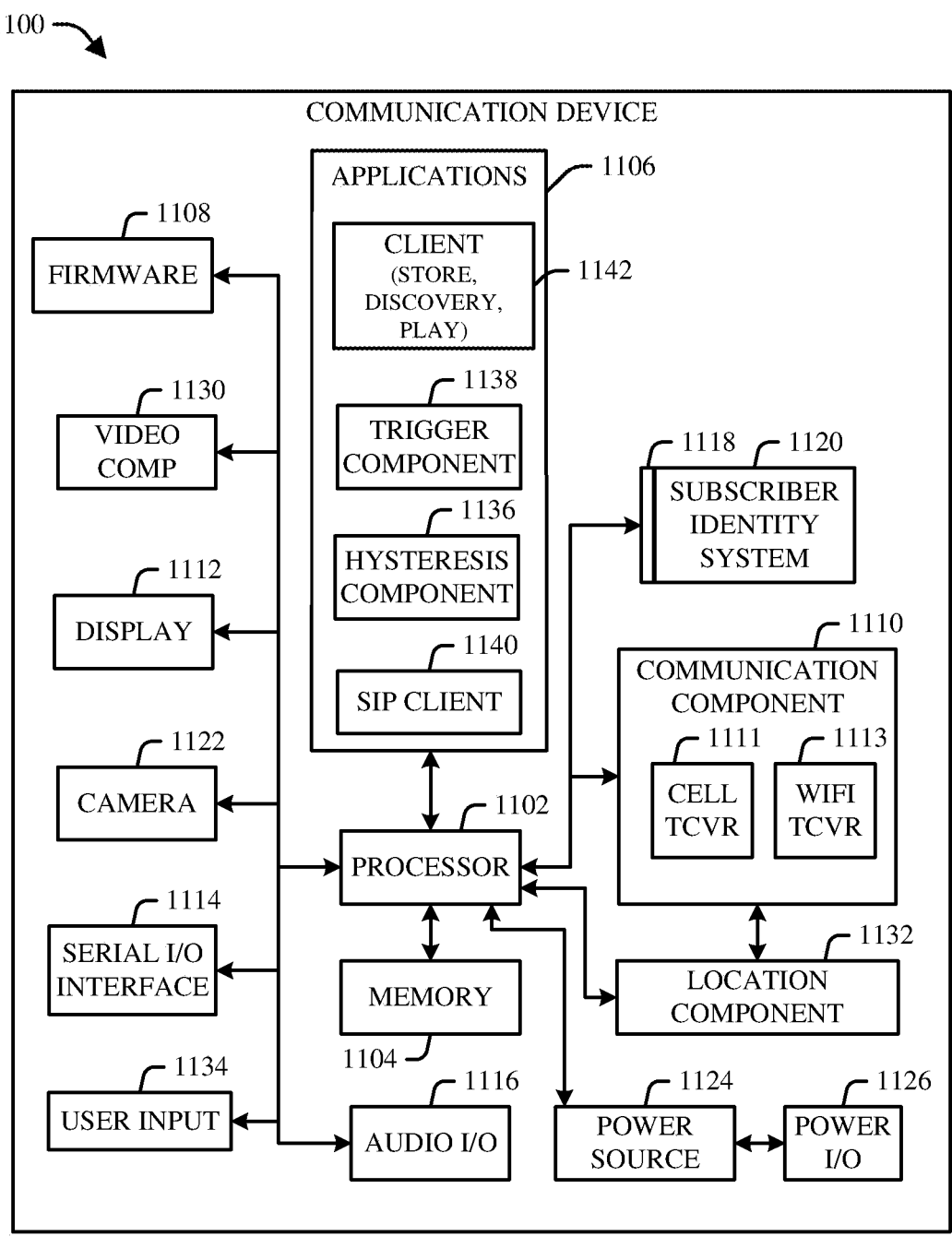
FIG. 11 depicts a block diagram of example communication device, in accordance with various aspects and embodiments of the disclosed subject matter.

Referring now to FIG. 11, depicted is an example block diagram of an example communication device 1100 (e.g., wireless or mobile phone, electronic pad or tablet, electronic eyewear, electronic watch, or other electronic bodywear, IoT device, or other type of communication device) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 1100 can include a processor 1102 for controlling and processing all onboard operations and functions. A memory 1104 interfaces to the processor 1102 for storage of data and one or more applications 1106 (e.g., a video player software, user feedback component software, or other type of application). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the communication device 1100. A communication component 1110 interfaces to the processor 1102 to facilitate wired/wireless communication with external systems, e.g., cellular systems, VoIP networks, and so on. Here, the communication component 1110 can also include a suitable cellular transceiver 1111 (e.g., a GSM transceiver) and/or an unlicensed transceiver 1113 (e.g., Wi-Fi, WiMax) for corresponding signal communications. The communication device 1100 can be a device such as a cellular telephone, a PDA with mobile communications capabilities, and messaging-centric devices. The communication component 1110 also facilitates communications reception from terrestrial radio networks (e.g., broadcast), digital satellite radio networks, and Internet-based radio services networks.

The communication device 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, or other content). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The communication device 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the communication device 1100, and updated by downloading data and software.

The communication device 1100 can process IP data traffic through the communication component 1110 to accommodate IP traffic from an IP network such as, for example, the Internet, a corporate intranet, a home network, a person area network, or other network, through an ISP or broadband cable provider. Thus, VoIP traffic can be utilized by the communication device 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video quotes. The communication device 1100 also includes a power source 1124 in the form of batteries and/or an AC power subsystem, which power source 1124 can interface to an external power system or charging equipment (not shown) by a power I/O component 1126.

The communication device 1100 can also include a video component 1130 for processing video content received and, for recording and transmitting video content. For example, the video component 1130 can facilitate the generation, editing and sharing of video quotes. A location tracking component 1132 facilitates geographically locating the communication device 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the communication device 1100 to support SIP protocols and register the subscriber with the SIP registrar server. The applications 1106 can also include a client 1142 that provides at least the capability of discovery, play and store of multimedia content, for example, music.

The communication device 1100, as indicated above related to the communication component 1110, includes an indoor network radio transceiver 1113 (e.g., Wi-Fi transceiver). This function supports the indoor radio link, such as IEEE 802.11, for the dual-mode GSM device (e.g., communication device 1100). The communication device 1100 can accommodate at least satellite radio services through a device (e.g., handset device) that can combine wireless voice and digital radio chipsets into a single device (e.g., single handheld device).

Figure 12:
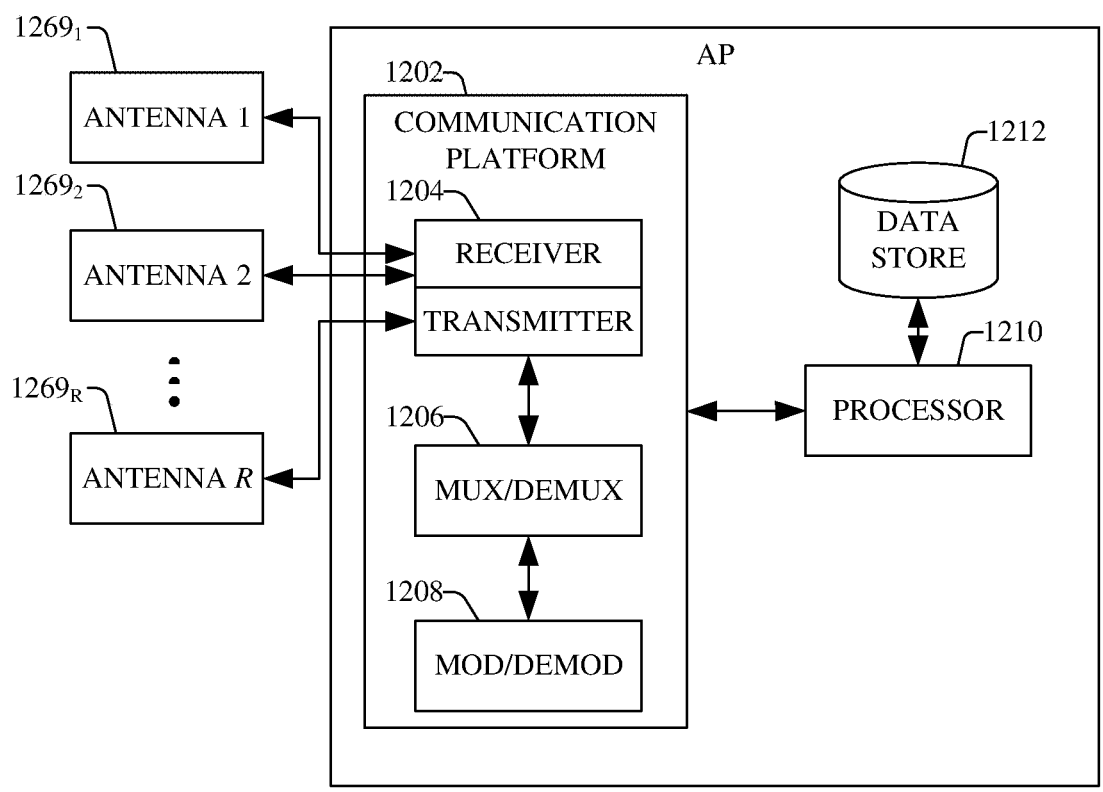
FIG. 12 illustrates a block diagram of an example access point, in accordance with various aspects and embodiments of the disclosed subject matter.

FIG. 12 illustrates a block diagram of an example AP 1200 (e.g., macro base station, femto AP, pico AP, Wi-Fi AP, Wi-Fi-direct AP, or other type of AP), in accordance with various aspects and embodiments of the disclosed subject matter. The AP 1200 can receive and transmit signal(s) from and to wireless devices like access points (e.g., base stations, femtocells, picocells, or other type of access point), access terminals (e.g., UEs), wireless ports and routers, and the like, through a set of antennas 12691-1269R. In an aspect, the antennas 12691-1269R are a part of a communication platform 1202, which comprises electronic components and associated circuitry that can provide for processing and manipulation of received signal(s) and signal(s) to be transmitted. In an aspect, the communication platform 1202 can include a receiver/transmitter 1204 that can convert signal from analog to digital upon reception, and from digital to analog upon transmission. In addition, receiver/transmitter 1204 can divide a single data stream into multiple, parallel data streams, or perform the reciprocal operation.

In an aspect, coupled to receiver/transmitter 1204 can be a multiplexer/demultiplexer (mux/demux) 1206 that can facilitate manipulation of signal in time and frequency space. The mux/demux 1206 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 1206 can scramble and spread information (e.g., codes) according to substantially any code known in the art, e.g., Hadamard-Walsh codes, Baker codes, Kasami codes, polyphase codes, and so on. A modulator/demodulator (mod/ demod) 1208 also can be part of the communication platform 1202, and can modulate information according to multiple modulation techniques, such as frequency modulation, amplitude modulation (e.g., M-ary quadrature amplitude modulation (QAM), with M a positive integer), phase-shift keying (PSK), and the like.

The AP 1200 also can comprise a processor(s) 1210 that can be configured to confer and/or facilitate providing functionality, at least partially, to substantially any electronic component in or associated with the AP 1200. For instance, the processor(s) 1210 can facilitate performance of operations on data (e.g., symbols, bits, or chips) for multiplexing/demultiplexing, modulation/demodulation, such as effecting direct and inverse fast Fourier transforms, selection of modulation rates, selection of data packet formats, inter-packet times, or other operations on data.

In another aspect, the AP 1200 can include a data store 1212 that can store data structures; code instructions; rate coding information; information relating to measurement of radio link quality or reception of information related thereto; information relating to communication conditions (e.g., SINR, implicit NACK rate, RSRP, RSRQ, CQI, and/or other wireless communications metrics or parameters) associated with communication devices, parameter data, threshold values associated with parameters, ACK/NACK-related information (e.g., ACK/NACK status information), time-related information, metadata, communication devices, policies and rules, users, applications, services, communication management criteria, traffic flows, signaling, algorithms (e.g., communication management algorithm(s), mapping algorithm(s), or other algorithm), protocols, interfaces, tools, and/or other information, etc.; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 1210 can be coupled to the data store 1212 in order to store and retrieve information (e.g., information, such as algorithms, relating to multiplexing/demultiplexing or modulation/demodulation; information relating to radio link levels; information relating to communication conditions (e.g., SINR, implicit NACK rate, RSRP, RSRQ, CQI, and/or other wireless communications metrics or parameters) associated with communication devices, parameter data, threshold values associated with the parameters, ACK/NACK-related information (e.g., ACK/NACK status information), time-related information, metadata, communication devices, policies and rules, users, applications, services, communication management criteria, traffic flows, signaling, algorithms (e.g., communication management algorithm(s), mapping algorithm(s), or other algorithm), protocols, interfaces, tools, and/or other information) desired to operate and/or confer functionality to the communication platform 1202 and/or other operational components of AP 1200.

Figure 13:
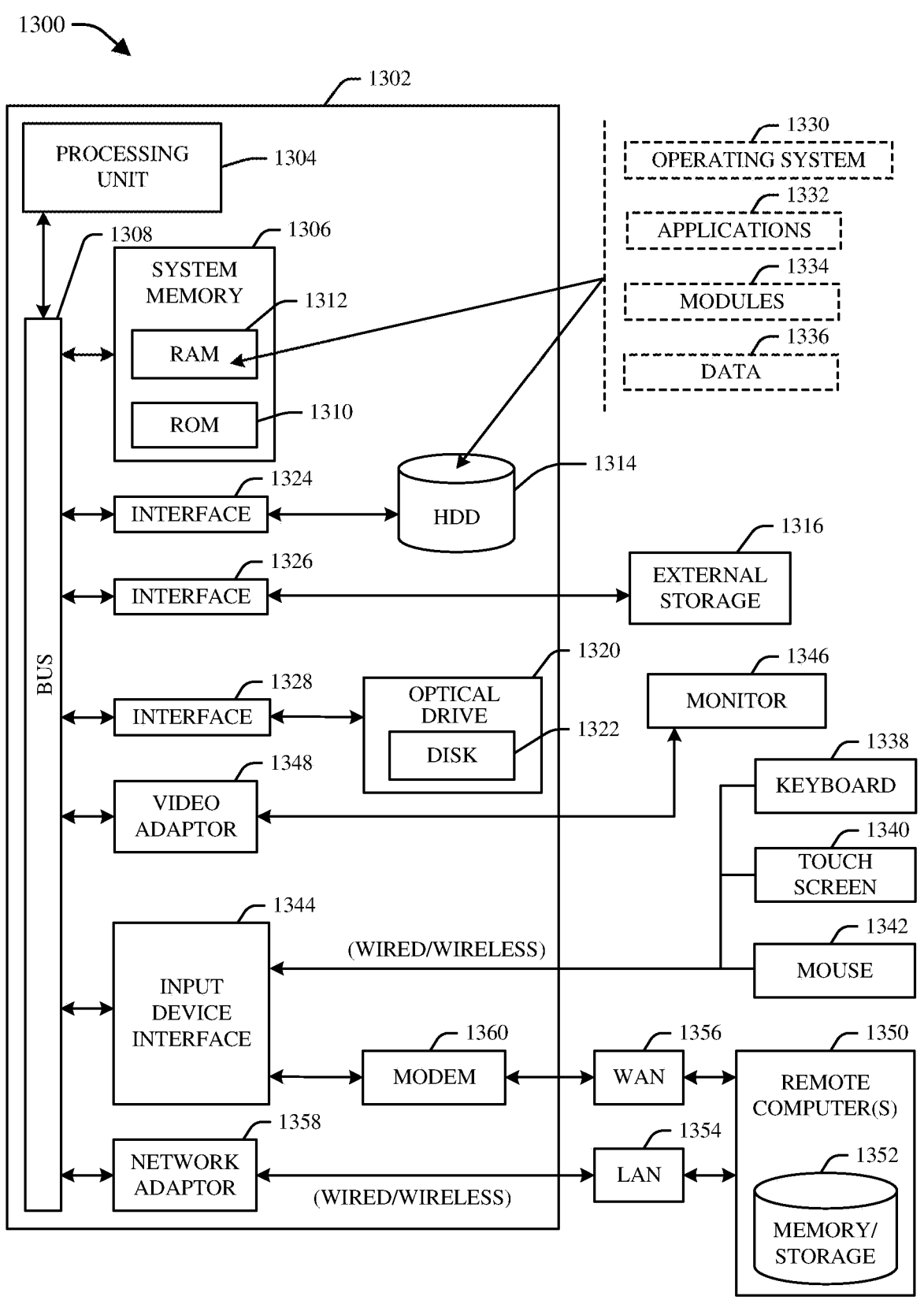
FIG. 13 is a schematic block diagram illustrating a suitable computing environment in which the various embodiments of the embodiments described herein can be implemented.

In order to provide additional context for various embodiments described herein, FIG. 13 and the following discussion are intended to provide a brief, general description of a suitable computing environment 1300 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, or other type of storage device) and an optical disk drive 1320 (e.g., which can read or write from a CD-ROM disc, a DVD, a BD, or other disk drive). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH™ interface, or other type of interface.

A monitor 1346 or other type of display device can be also connected to the system bus 1308 via an interface, such as a video adapter 1348. In addition to the monitor 1346, a computer typically includes other peripheral output devices (not shown), such as speakers, printers, or other type of peripheral output device.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN)

1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356, e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, or other equipment or entity), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, or other alphanumeric character) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b)

data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); or other type of wireless telecommunication or radio technology. Additionally, some or all of the aspects described herein can be exploited in legacy telecommunication technologies, e.g., GSM. In addition, mobile as well non-mobile networks (e.g., the internet, data service network such as internet protocol television (IPTV), or other network) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, or other type of magnetic storage device), optical discs (e.g., compact disc (CD), digital versatile disc (DVD), blu-ray disc (BD), or other type of optical disc), smart cards, and memory devices comprising volatile memory and/or nonvolatile memory (e.g., flash memory devices, such as, for example, card, stick, key drive, or other type of memory device), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication network, network equipment, information management component (IMC), communication device, resources, AI component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:

a processor; and a memory that stores executable instructions that, when executed by the processor, facilitate performance of operations, comprising:

analyzing a first group of items of data and a second group of items of data, wherein the first group of items of data comprises respective signal measurement data in a communication network and the second group of items of data comprises respective communication network-related data associated with respective devices associated with network equipment associated with the communication network, wherein the analyzing comprises performing an artificial intelligence or machine learning analysis on the first group of items of data and the second group of items of data;

based on the analyzing, determining a spatial-temporal pattern associated with at least one of the first group of items of data and the second group of items of data; and identifying a cause of a performance level relating to provision of device communication services in the communication network not satisfying a minimum threshold performance level.

2. The system of claim 1, wherein the operations further comprise:

receiving a search query;

querying for a first search query result that is responsive to the search query, wherein the first search query result relates to the first group of items of data; and querying for a second search query result that is responsive to the search query, wherein the second search query result relates to the second group of items of data.

3. The system of claim 2, wherein the determining a spatial-temporal pattern associated with at least one of the first group of items of data and the second group of items of data comprises determining a spatial-temporal pattern that relates to a topic of interest, and wherein the receiving a search query comprises receiving a search query relating to the topic of interest.

4. The system of claim 1, wherein the operations further comprise:

storing the first group of items of data in a first format in a first data store; and storing the second group of items of data in a second format in a second data store.

5. The system of claim 4, wherein the operations further comprise:

storing the first group of items of data in a relational data store in the first format that is associated with a relational structure; and storing the second group of data items in a non-relational data store in the second format that is associated with a non-relational structure, and wherein the non-relational data store comprises a time-series data store.

6. The system of claim 4, wherein the operations further comprise:

receiving a search query, comprising search query data in a third format;

translating the search query data from the third format to first modified search query data in the first format associated with the first data store;

querying the first data store for a first search query result that is responsive to the search query based on the first modified search query data, wherein the first search query result relates to the first group of items of data;

translating the search query data from the third format to second modified search query data in the second format associated with the second data store; and querying the second data store for a second search query result that is responsive to the search query based on the second modified search query data, wherein the second search query result relates to the second group of items of data.

7. The system of claim 1, wherein the identifying a cause of a performance level relating to provision of device communication services in the communication network not satisfying a minimum threshold performance level comprises:

determining a geographical area that is associated with the performance level relating to provision of device communication services that does not satisfy the minimum threshold performance level, wherein the geographical area is associated with a portion of the respective devices.

8. The system of claim 7, wherein the determining a geographical area that is associated with the performance level relating to provision of device communication services that does not satisfy the minimum threshold performance level comprises:

identifying network equipment associated with the geographical area.

9. The system of claim 1, wherein the operations further comprise:

training, by the system, an artificial intelligence or machine learning model based on the artificial intelligence or machine learning analysis and the first group of items of data and the second group of items of data.

10. The system of claim 9, wherein the operations further comprise:

based on the artificial intelligence or machine learning model, predicting, to a defined degree of likelihood, the spatial-temporal pattern associated with the first group of items of data and the second group of items of data.

11. The system of claim 10, wherein the operations further comprise:

predicting, to a second defined degree of likelihood, a relationship between a first subgroup of items of data of the first group of items of data and a second subgroup of items of data of the second group of items of data; and clustering, by the system, the first subgroup of items of data and the second subgroup of items of data to form a cluster comprising the first subgroup of items of data and the second subgroup of items of data.

12. The system of claim 1, wherein at least a portion of the system is instantiated at an edge of the communication network to reduce an amount of time latency associated with the analyzing, the determining, and the identifying the cause of the performance level not satisfying a minimum threshold performance level.

13. A non-transitory machine-readable medium, comprising executable instructions that, when executed by a processor, facilitate performance of operations, comprising:

examining a first group of items of information and a second group of items of information, wherein the second group of items of information comprises respective communication network-related information associated with different user equipment associated with network equipment of a communication network; and determining a spatial-temporal relationship associated with the first group of items of information and the second group of items of information, wherein the spatial-temporal relationship relates to an attribute of interest to an operator of the communication network, wherein the examining and the determining are performed at an edge of a communication network to reduce a time latency associated with the examining and the determining the spatial-temporal relationship.

14. The non-transitory machine-readable medium of claim 13, wherein the examining a first group of items of information comprises:

examining respective signal measurement data in the communication network.

15. The non-transitory machine-readable medium of claim 13, wherein the examining a first group of items of information comprises:

examining respective call records associated with respective devices in the communication network.

16. The non-transitory machine-readable medium of claim 13, wherein the examining a first group of items of information comprises:

examining performance indicators associated with respective devices in the communication network.

17. A method, comprising:

retrieving, by a processing system including a processor, a first group of items of data and a second group of items of data, wherein the second group of items of data comprises respective signal measurement data representative of respective signal measurements associated with respective devices associated with network equipment that is part of a communication network;

performing, by the processing system, an analysis using an artificial intelligence or machine learning model on the first group of items of data and the second group of items of data; and determining, by the processing system, based on a result of the analysis, a spatial-temporal pattern associated with the first group of items of data and the second group of items of data, wherein the spatial-temporal pattern relates to a subject of interest to an operator of the communication network.

18. The method of claim 17, wherein the determining the spatial-temporal pattern comprises:

predicting, by the processing system, to a defined probability level, the spatial-temporal pattern associated with the first group of items of data and the second group of items of data based on the artificial intelligence or machine learning model.

19. The method of claim 18, wherein the defined probability level comprises a first defined probability level, and wherein the method further comprises:

predicting, by the processing system, to a second defined probability level, relationships between a first portion of the first group of items of data and a second portion of the second group of items of data, wherein the predicting is based on the artificial intelligence or machine learning model and the analysis using an artificial intelligence or machine learning model on the first group of items of data and the second group of items of data; and clustering, by the processing system, the first portion of the first group of items of data and the second portion of the second group of items of data to form a cluster.

20. The method of claim 19, wherein the clustering the first portion of the first group of items of data and the second portion of the second group of items of data comprises:

inferring, by the processing system, spatial-temporal patterns in or among the first portion of the first group of items of data and the second portion of the second group of items of data.

* * * * *